(12) United States Patent
Fuchs

(10) Patent No.: US 11,701,536 B2
(45) Date of Patent: Jul. 18, 2023

(54) PEDAL DRIVE SYSTEM

(71) Applicant: Swissmove AG, Emmenbruicke (CH)

(72) Inventor: Andreas Fuchs, Bern (CH)

(73) Assignee: SWISSMOVE C/O ANWALTS—UND WIRTSCHAFTSKANZLEI KMUFORUM GMBH, Emmenbruecke (CH)

( * ) Notice: Subject to any disclaimer, the term of this patent is extended or adjusted under 35 U.S.C. 154(b) by 917 days.

(21) Appl. No.: 16/538,077

(22) Filed: Aug. 12, 2019

(65) Prior Publication Data

US 2019/0358483 A1 Nov. 28, 2019

Related U.S. Application Data

(63) Continuation-in-part of application No. 16/072,452, filed as application No. PCT/EP2016/071602 on Sep. 13, 2016, now Pat. No. 10,376,731.

(30) Foreign Application Priority Data

Jan. 26, 2016 (EP) ..................................... 16152850

(51) Int. Cl.
*A63B 21/005* (2006.01)
*B62M 6/45* (2010.01)
(Continued)

(52) U.S. Cl.
CPC .... *A63B 21/0054* (2015.10); *A63B 21/00178* (2013.01); *A63B 21/00181* (2013.01);
(Continued)

(58) Field of Classification Search
CPC .......... A63B 21/0054; A63B 21/00178; A63B 21/00181; A63B 22/0605; A63B 24/0006;
(Continued)

(56) References Cited

U.S. PATENT DOCUMENTS 5,214,358 A 5/1993 Marshall ........................ 318/139
5,466,200 A * 11/1995 Ulrich ................... A63F 13/285
482/3

(Continued)

FOREIGN PATENT DOCUMENTS

DE 102011083980 A1 4/2013 .............. B62M 6/45
DE 102011084896 A1 4/2013 .............. B62M 6/45
(Continued)

OTHER PUBLICATIONS https://www.merriam-webster.com/dictionary/trajectory (Year: 2022).*

*Primary Examiner* — Andrew S Lo
*Assistant Examiner* — Andrew M Kobylarz
(74) *Attorney, Agent, or Firm* — Slayden Grubert Beard PLLC

(57) ABSTRACT

A pedal drive system, in particular for an electric vehicle or a training apparatus, and for generating electrical power from muscle power of a user with at least one pedal and an electric generator, connected mechanically with said at least one pedal, is provided. To improve the haptic feel and feedback at the pedal, a control unit is provided for controlling a feedback torque, applied at said pedal, wherein the control unit comprises a haptic renderer, configured for control of said feedback torque based on at least one user-defined pedal reference trajectory.

21 Claims, 10 Drawing Sheets

(51) Int. Cl.
    *A63B 21/00*     (2006.01)
    *A63B 22/06*     (2006.01)
    *B62M 19/00*     (2006.01)
    *A63B 24/00*     (2006.01)

(52) U.S. Cl.
CPC ...... *A63B 22/0605* (2013.01); *A63B 24/0006* (2013.01); *B62M 6/45* (2013.01); *B62M 19/00* (2013.01); *A63B 2024/0009* (2013.01); *A63B 2024/0012* (2013.01); *B62K 2204/00* (2013.01)

(58) Field of Classification Search
CPC .... A63B 2024/0009; A63B 2024/0012; A63B 2024/0093; A63B 24/0087; B62M 6/45; B62M 19/00; B62K 2204/00
See application file for complete search history.

(56) References Cited

U.S. PATENT DOCUMENTS

| | | | | |
|---|---|---|---|---|
| 5,690,582 | A * | 11/1997 | Ulrich | A63F 13/816 |
| | | | | 482/52 |
| 5,785,630 | A * | 7/1998 | Bobick | A63F 13/803 |
| | | | | 482/3 |
| 5,890,995 | A * | 4/1999 | Bobick | A63B 26/003 |
| | | | | 482/4 |
| 6,450,922 | B1 * | 9/2002 | Henderson | A63B 24/0062 |
| | | | | 482/901 |
| 7,156,780 | B1 | 1/2007 | Fuchs et al. | 482/92 |
| 10,035,558 | B2 * | 7/2018 | Zenner | B62M 6/90 |
| 10,376,731 | B2 * | 8/2019 | Fuchs | B60L 15/2009 |
| 10,988,206 | B1 * | 4/2021 | Chang | B62J 45/412 |
| 11,040,248 | B2 * | 6/2021 | Kong | A63B 24/0062 |
| 11,225,301 | B2 * | 1/2022 | Wendt | B60L 50/20 |
| 11,348,683 | B2 * | 5/2022 | Guaneri | G06Q 10/10 |
| 11,404,150 | B2 * | 8/2022 | Guaneri | G06F 21/32 |
| 11,410,768 | B2 * | 8/2022 | Mason | G16H 50/70 |
| 11,433,276 | B2 * | 9/2022 | Bissonnette | A63B 23/03533 |
| 11,445,985 | B2 * | 9/2022 | Mason | G16H 40/67 |
| 11,471,729 | B2 * | 10/2022 | Hacking | A63B 24/0087 |
| 2004/0178634 | A1 | 9/2004 | Eskandr | 290/1 R |
| 2009/0095552 | A1 | 4/2009 | Gulas | 180/206.5 |
| 2010/0154585 | A1 | 6/2010 | Yang | 74/810.1 |
| 2010/0154586 | A1 | 6/2010 | Yang | 74/810.1 |
| 2015/0170530 | A1 | 6/2015 | Damman | G06F 16/951 |
| | | | | 700/91 |
| 2016/0023081 | A1 * | 1/2016 | Popa-Simil | B62J 45/412 |
| | | | | 700/91 |
| 2016/0058372 | A1 * | 3/2016 | Raghuram | A61B 5/681 |
| | | | | 600/595 |
| 2016/0220866 | A1 * | 8/2016 | Feichtinger | G16H 20/30 |
| 2016/0362021 | A1 * | 12/2016 | Sveje | B60L 50/20 |
| 2017/0168555 | A1 * | 6/2017 | Munoz | G06F 1/3265 |
| 2019/0031284 | A1 * | 1/2019 | Fuchs | A63B 22/0605 |
| 2020/0151646 | A1 * | 5/2020 | De La Fuente Sanchez | G06Q 10/06398 |
| 2021/0138304 | A1 * | 5/2021 | Mason | A63B 24/0062 |
| 2022/0016484 | A1 * | 1/2022 | Bissonnette | A63B 24/0062 |
| 2022/0047921 | A1 * | 2/2022 | Bissonnette | A63B 23/0355 |

FOREIGN PATENT DOCUMENTS

| | | | |
|---|---|---|---|
| EP | 2711285 A1 | 3/2014 | B62M 6/45 |
| WO | 00/59773 A2 | 10/2000 | A63B 21/005 |
| WO | WO-2015191536 A1 * | 6/2015 | B60L 11/18 |
| WO | 2015/128818 A1 | 9/2015 | B62M 7/12 |
| WO | 2015/191536 A1 | 12/2015 | B60L 11/18 |

\* cited by examiner

PEDAL DRIVE SYSTEM

CROSS-REFERENCE TO RELATED APPLICATIONS

The present patent application is a continuation-in-part application of U.S. patent application Ser. No. 16/072,452, filed as PCT/EP2016/071602 on Sep. 13, 2016. PCT/EP2016/071602 claims priority benefit of EP 16152850.0, filed on Jan. 26, 2016. The contents of the aforementioned applications and of publication WO 00/059773 A2 are incorporated herein by reference for all purposes to the extent that such subject matter is not inconsistent herewith or limiting hereof.

TECHNICAL FIELD

The present invention relates to the field of electric transportation, in particular to muscle-operated vehicles, and to drive systems for electric vehicles.

BACKGROUND

In the field of transportation, the continued development of battery technology enabled intensified use of electrically powered vehicles. It is estimated that the use of electrically powered vehicles, also referred to as "electric vehicles", will continue to rise in the near future. Besides vehicles that are entirely operated using electric power, hybrid vehicles are available using various drivetrain setups, such as parallel- and series-type hybrid vehicles. For example, hybrid vehicles are commercially available, which are in part operated by muscle power of an operator, and which also comprise an electric motor, e.g., for support of the operator, to minimize fatigue and to extend the range. Such drive concepts are in particular used in bicycles, tricycles, quadracycles, boats, airplanes or helicopters, i.e., virtually in any type of vehicle.

In the recent past, series-type hybrid drives have been made available, where an operator provides input muscle power by using one or two foot-pedals, levers, or handles. The provided input muscle power is converted into electric energy using a generator, which is mechanically coupled to the respective pedal, lever, or handle. The electric energy is then fed to an electric motor to drive the vehicle, e.g., together with electric energy from a battery in case some support, also known as "power assist", is required. Accordingly, vehicles using this setup are also referred to as having an "electric transmission", since there is no connection between pedal and wheel that could convey mechanical propulsive power. These vehicles are similar to the common "Pedelecs", but the mechanical setup of such vehicles is much simpler and thus cheaper than the typical setup of a Pedelec, in particular since no chain, belt, or transmission shaft and no elaborate mechanical or hydraulical gear shift mechanism is necessary. In addition, hybrid vehicles with an electric transmission can be configured in a flexible way, e.g., to match the use of the respective operator.

A particular challenge with series-type, muscle-operated hybrid electric vehicles, however, is given in that an operator typically expects the mechanical interaction, i.e., the "feel" or "feedback" of the drive system to be similar to that of a known corresponding vehicle having a mechanical drivetrain. For example, in a case of a hybrid electric bicycle having pedals, an operator typically expects the pedals to respond like the pedals of a common "mechanical" bicycle, including the usual resistance torque of the pedal due to the inertia of the bicycle and its chain/wheel drive.

In a series-type hybrid electric vehicle, the mass of the pedals, the generator coupled to them and an optional transmission in between usually is negligible, e.g. in comparison to the total mass of the vehicle and the operator. Therefore, this mass does not give rise to any significant resistance torque. Further, some resistance torque is generated by "dissipative" or "damping" effects such as mechanical friction, eddy currents and hysteresis losses. The order of magnitude of the torque due to these effects can be e.g. 1-3 Nm, which is rather low. Also, the operator may experience an electrical resistance torque due to the power generation in the generator. However, this torque, which, in most electrical machines, is proportional to the output current of the generator, can also be relatively low, depending on the type of generator and how it is operated. This leads to an unexpected "feel" of the drive system during use. The unexpected feel or behavior of such vehicle may in turn be conceived by an operator as not particularly ergonomic. In addition, in the case of a foot-operated series-type electric bicycle, a lack of enough pedal resistance torque can possibly lead to dangerous situations. For example, upon starting to pedal, a lack of pedal resistance torque may cause the operator to lose balance on the vehicle or even slide off the pedal, since the behavior is not as it would be expected from a common bicycle having a traditional bicycle drive train.

In the prior art, the problem of an unexpected behavior of series-type hybrid electric vehicles was addressed, e.g., in WO 00/059773 A2 of the present inventor. The latter document in particular addresses the situation upon starting to pedal and improves the behavior significantly. US 2009/0095552 A1 describes a further approach to provide a largely "natural" behavior of a series-type hybrid vehicle, comparable to a mechanically driven vehicle. Here, the speed of the pedal crank is related to the travel velocity in a way that is comprehensible to a user of the vehicle. The system of US 2009/0095552 A1 comprises a braking unit, which opposes the rotation of the pedal crank. The braking unit may, e.g., comprise a flywheel mass. The pedal crank of this reference is not primarily used for generating energy to propel the vehicle, but rather for controlling the travel velocity of the vehicle.

Certainly, carrying along a flywheel mass on an hybrid electric vehicle leads to a reduced efficiency due to unnecessary friction and increased weight. But even without using a flywheel mass, the direct coupling of the pedal crank with the vehicle speed according to the prior art may be disadvantageous, since due to the characteristic pedaling of a human, inevitable variations in the provided pedaling speed causes variations in the vehicle speed, which in turn may result in poor vehicle handling, such as in particular reduced traction control on hard and slick surfaces, e.g., during inclement weather conditions.

Accordingly, a pedal drive system is needed that provides an improved haptic feel and feedback to a user/operator, while avoiding one or more disadvantages of the prior art.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a pedal drive system for generating electrical power from muscle power of a user is provided with at least one pedal, an electric generator, connected mechanically with said at least one pedal, and a control unit for controlling a feedback torque, applied at said pedal. The control unit comprises a haptic renderer, configured for control of said feedback torque based on at least one pedal reference trajectory. For sake of brevity, the user is in the following referred to as "he". This, however, is intended to include female and male users, i.e., "she" and "he".

The basic idea of the present invention is to provide a pedal drive system that allows to provide a controllable feedback torque to a user, which feedback torque is controlled by a control unit of the pedal drive system itself. In the context of electric vehicles, the present invention thus allows to decouple the control of the pedal drive from the control of the wheel drive. Accordingly, it is possible on one hand to control the torque/feedback torque at the pedal as desired, while simultaneously it is also possible to control the wheel drive as desired, i.e., according to the respective driving conditions.

The invention in the context of electric vehicles thus allows both, improved haptic feel and feedback at the pedal, as well as improved vehicle handling. Certainly, the thus autonomous/independent pedal drive system can also be used outside of the field of electric land, water or air vehicles, such as in stationary exercise bikes, training apparatus, or other exercise or therapy devices.

These and other aspects of the invention will be apparent from and elucidated with reference to the embodiments described hereinafter.

DETAILED DESCRIPTION OF PREFERRED EMBODIMENTS

Figure 1:
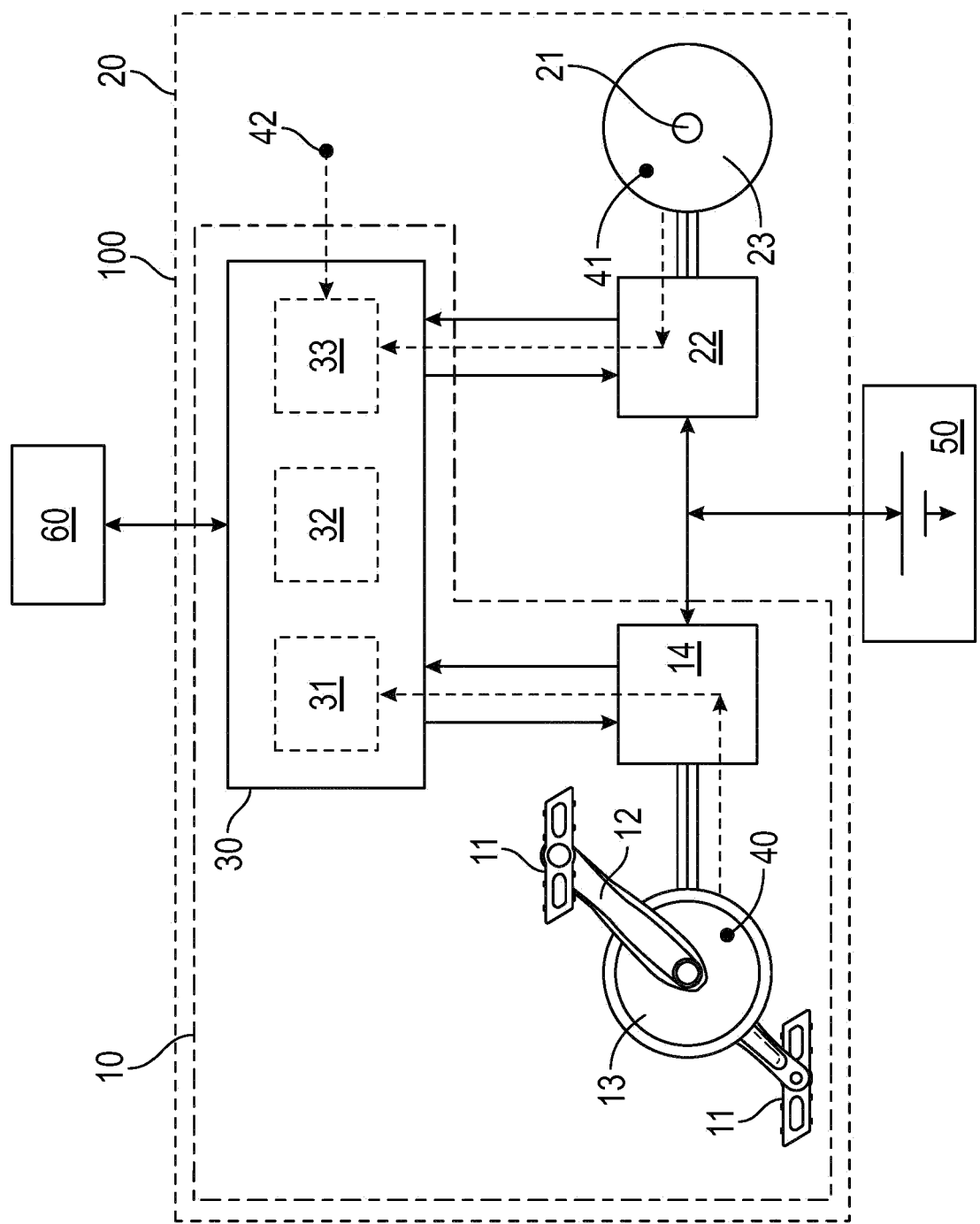
FIG. 1 shows a schematic representation of components of an electric vehicle comprising an inventive pedal drive system and an inventive electric drive system.

Technical features described in this application can be used to construct various embodiments of pedal drive systems, electric vehicles, training apparatus, electric drive systems, and methods for operating a pedal drive system according to the preceding and following description. Some embodiments of the invention are discussed so as to enable one skilled in the art to make and use the invention.

In the following explanation of the present invention according to the embodiments described, the terms "connected to" or "connected with" are used to indicate a connection between at least two components, elements or modules. Such connection may be direct or indirect, i.e., over intermediate components, elements or modules.

In a first exemplary aspect, a pedal drive system for generating electrical power from muscle power of a user is provided with at least one pedal, an electric generator, connected mechanically with said at least one pedal, and a control unit for controlling a feedback torque, applied at said pedal. The control unit comprises a haptic renderer, configured for control of said feedback torque based on at least one pedal reference trajectory.

The pedal drive system according to the present aspect allows to generate electrical energy from muscle power and correspondingly comprises a pedal and an electric generator, wherein the electric generator is connected mechanically with said at least one pedal. In the present context, the term "connected mechanically" is understood to comprise all suitable setups allowing to transfer a force from the pedal to the generator and vice versa. The connection may be direct or indirect over intermediate components, such as over a gear mechanism. It is noted that the term "mechanical" in this context comprises setups, which are not strictly mechanical, but e.g. pneumatic or hydraulic.

Although in most embodiments, the at least one pedal may be provided to allow a rotational movement and thus to provide an input torque, provided by the user, it is noted that such may not necessarily be the case. For example, in an alternative embodiment, the pedal may be provided for the exertion of muscle power in a linear movement, which then consequently is converted into electric energy by a suitable linear generator or a mechanism converting a mostly linear movement into a rotational movement if the generator is of a rotational type. In case of a linear movement, certainly, the user would provide an input force instead of an input torque and the control unit would provide a feedback force instead of a feedback torque. However, the operation in this case corresponds to the discussion below. For sake of simplicity, the following description refers explicitly to the rotational quantities only, i.e., torque, angular velocity etc. However, it is to be understood that this includes the corresponding linear quantities, i.e., force instead of torque, linear velocity instead of angular velocity, etc.

Accordingly, the at least one pedal may for example be a foot pedal in one embodiment or a hand operated lever in another embodiment. In a further embodiment, the pedal drive system is configured for bipedal operation, comprising at least two pedals with associated cranks that are provided in a typical bicycle pedal setup, i.e., for rotation around a common axis of rotation, which e.g., may be a bottom bracket axle.

As discussed in the preceding, the pedal drive system further comprises a control unit, which is configured to control a feedback torque, applied at the pedal. To this respect, the control unit is configured for active control. In the context of the present invention, the term feedback torque comprises both a counter torque and a supporting, i.e., assistive, torque. A counter torque is understood as a torque applied in a direction opposite to the input torque of the user. The counter torque provides a certain resistance to the user. A supporting torque is provided in the direction of the input torque of the user, i.e., to support the pedaling effort of the user. It should be noted that a supporting torque as well as a counter torque can be provided by operating the electric generator as a motor, i.e., in a "motor" mode. A counter torque may also be provided by operating the electric generator in a "normal" or "generator" mode, i.e., so that it generates electric energy. The feedback torque accordingly provides a defined "haptic feedback" to the user, which in one embodiment may provide the user with a feel similar to that of a known mechanical bicycle. Such "bicycle-similar" feel is understood to comprise a temporally and spatially well defined resistance at the pedal. The feedback torque in a further embodiment is an electrically generated feedback torque, i.e., provided by applying an electric current to the generator (in the "motor" mode) or by using the generator to deliver a current (in the "generator" mode) e.g. to an electrical load. The term "haptic" in the context of this explanation refers to a perception by making physical contact with the at least one pedal. To this extent this term refers to strictly haptic perception as well as tactile and proprioceptive perception.

Certainly, the pedal drive system described herein also allows to provide a haptic feedback that differs from that of a mechanical bicycle. For example, and in one embodiment, the pedal drive system may be programmed with custom settings of a user, e.g., a predefined operating point, defined by a preferred cadence ("cadence" here and in the following referring to the number of motion cycles—usually rotations—of the at least one pedal per time unit, which may also be referred to as the pedal frequency), or a preferred gradient in terms of the change of the pedaling torque with the cadence (Nm/rpm) under load. In a further embodiment, the pedal drive system may be configured to support the user with a brief supporting torque, e.g. every time when a pedal is at the top dead center during the pedal rotation. In another exemplary embodiment, the pedal drive system may be adapted for rehabilitation training applications with the respective requirements of the application. In such case, the user may be supported with a supporting torque for a larger part of the pedal rotation, e.g. in order to compensate for a disablement of one leg of the user. Also, if a user has limited control of the movement of at least one leg, it may be necessary to smoothen the movement of the at least one pedal by applying an appropriate supporting or counter torque during the entire pedal rotation. Also, the haptic feedback may contain high frequency components to signal something to the user, e.g. a warning of a malfunction of the vehicle or the drive system, or that personal limits like maximum pedaling power or heart rate are exceeded. To signal something, high frequency components may be superimposed onto the reference trajectory, which would result in a "vibration alert" feeling.

The feedback torque can be applied during operation of the system, wherein the term "during operation" is understood broadly and means any state of the system being powered, and is not limited to a state of pedaling forward (or backward) of the user. For example, the control unit may in one embodiment be configured to apply a holding or clamping torque to the pedal before and/or after the pedaling of the user, which in this context is also considered to be "during operation" of the pedal drive system. The same applies for an embodiment in which the control unit is configured to apply a supporting torque that assists the user in moving the pedal backwards e.g. to an optimum starting position.

The control unit comprises at least a haptic renderer, as discussed in the preceding. The haptic renderer is configured for control of the feedback torque based on at least one predefined pedal reference trajectory.

The pedal reference trajectory in one embodiment defines pedal cadence and/or pedal acceleration over the pedal position/angle for at least a part of a pedal revolution. Of course, instead of pedal cadence, which corresponds to frequency, a pedal angular velocity may be used, which only differs by a constant factor of $\pi/30$ (with the angular velocity being measured in rad/s and the cadence being measured in 1/min). Instead of pedal position, it is alternatively or additionally in according embodiments possible that the pedal reference trajectory is defined over time, which corresponds to a defined pedal position, once the system is initialized with a given set point. If given as a function of time, the pedal trajectory may in general define the pedal angular position and/or any of its time derivatives (angular velocity, angular acceleration, etc.). Any of the derivatives may also be defined as a function of the pedal position. In further embodiments, the pedal reference trajectory provides a defined pedal cadence and/or acceleration behavior for a fraction of a revolution, for one revolution or for multiple pedal revolutions. It should be noted that the angular position can be calculated from its derivatives (apart from integration constants, which may be obtained by calibration or the like) and vice versa. To this respect, it is also possible that the trajectory is stored as information on one parameter, e.g. angular position, but is used as information on another parameter, e.g. cadence. In this case, the control unit is configured for a corresponding conversion.

The haptic renderer controls the feedback torque to obtain the desired course of pedal cadence or acceleration according to the pedal reference trajectory. The according control of the haptic renderer is based on the present inventor's recognition that with a human user, pedal cadence and acceleration can be controlled by the feedback torque provided to the user, i.e., the pedaling resistance or support the user feels due to the generator working in "normal" mode or "motor" mode. The corresponding control is somewhat similar to a force/torque control in the field of robotics or gaming.

In this concept, the reference trajectory to some extent may "simulate" or "reproduce" the inertia of a mechanical bicycle (i.e., a bicycle with a mechanical drivetrain). In such a mechanical bicycle, the inertia is felt by a user at the pedals in that he cannot change the motion of the pedals abruptly and arbitrarily. The pedals rather appear to have an "increased" inertia which results from the mechanical coupling of the pedal(s) to a driven wheel, which in turn is coupled to the bicycle and the user. Since the motion state of the bicycle cannot change abruptly, neither can the motion state of the pedals. I.e., at least for some time interval, the motion of the pedals is predetermined or limited. This behavior of a mechanical bicycle can be simulated in the present invention by the predefined reference trajectory. However, the reference trajectory does not necessarily have to represent (at least not exactly) a trajectory found in a mechanical bicycle, as discussed in the preceding.

It should be noted that while the haptic renderer may provide a supporting torque as well as a counter torque, in some embodiments the supporting torque may be limited. For instance, the supporting torque may be limited to compensate a torque generated by frictional forces. Without any limitation like this, a supporting torque could pull the pedal and a user's foot (or hand, respectively) placed on the pedal along a predefined reference trajectory, which could be unexpected and uncomfortable to the user. From his experience with mechanical bicycles, a user is used to a freewheel, which allows him to stop the motion of the pedals while the bicycle keeps moving on. To provide a similar feeling to the user, the haptic renderer in an embodiment is adapted to provide an "electronic freewheel" by limiting a supporting torque. However, in contrast to a freewheel in a mechanical bicycle, in an embodiment, a counter torque is always present when the user reduces the cadence. In a mechanical bicycle, reducing the cadence leads to decoupling the pedal from the driven wheel by the freewheel mechanism. In the present drive system, however, a counter torque which supports the reduction of the cadence may still be present. This has two advantages. On the one hand, the user still feels some resistance in the pedal, which may help to stabilize him. On the other hand, if the counter torque is generated by the generator, kinetic energy from the user's legs (or arms, respectively) can be converted into electric energy, i.e., it can be recuperated. While in a mechanical bicycle, the pedal may only be either completely coupled to or completely decoupled from the driven wheel, the counter torque in a hybrid electric vehicle may correspond to an "intermediate" coupling state.

The control unit may in a further embodiment comprise an inertia modeler, configured to iteratively adapt the at least one pedal reference trajectory, which adapted pedal reference trajectory is provided to the haptic renderer for control of said feedback torque. Micro-controllers available today allow fast, even massive computing and hence iterative operation of the inertia modeler. In particular, differences between an expected pedaling behavior according to the desired pedal reference trajectory and the actual (current or past) pedaling behavior may be determined by the inertia modeler, which in turn adapts the reference trajectory based on the differences. Such differences may indicate that the user is trying to accelerate or decelerate by changing the applied input torque. However, the adaption may depend on other parameters, e.g. time or cadence, and does not necessarily have to depend on variations of the actual pedaling behavior. In particular, it may not depend on the state of operation of any vehicle drive wheel(s).

Normally, the adaption of the pedal reference trajectory is carried out at predefined intervals, i.e., after a predetermined amount of time or, alternatively, after a predefined angular movement of the pedal. The time intervals do not have to be constant. Rather, the length of the time intervals could depend e.g. on the present cadence or the present velocity of a vehicle driven by the drive system, its acceleration or whether a computing device implementing the inertial modeler is temporarily doing other calculations. Also, the term "predetermined" does not imply that all intervals have to be predetermined when the user starts operation of the drive system. In one simple mode of carrying out the invention according to one embodiment, however, all intervals have the same constant length, which is predetermined before operation begins.

A correspondingly adapted pedal reference trajectory is provided to the haptic renderer for control of the feedback torque. In general, the adapted reference trajectory will lead to a different feedback torque. E.g. if the user applies the same input torque, a different reference trajectory may lead to a different feedback torque.

The control unit may be of any suitable type and in general may comprise a micro controller or micro processor, having a suitable programming to provide the functionality of the described haptic renderer and—if applicable—the inertia modeler. The control unit may also be referred to as an "adapter" or an "abstraction layer". This intermediate layer allows to physically decouple human and machine, but allows to display an ergonomical pedaling behavior at the pedals and to realize a dynamical but safe drive at the driving wheels (if such driving wheels are present). In particular, field programmable gate arrays (FPGAs) may be used in view of their fast current control and hence very fast torque control.

In one embodiment, the haptic renderer is configured for impedance control of said feedback torque so that movement of the pedal is adapted to the pedal reference trajectory. As already indicated above, the at least one pedal may be "guided" along the reference trajectory. As is known from literature (e.g. from Fregly B J, Zajac F E, Dairaghi C A. Bicycle drive system dynamics: theory and experimental validation. J Biomech Eng. 2000 August; 122(4):446-52), the angular acceleration of the pedal crank of a mechanical bicycle can be calculated according to the following equation:

$$I_{eff}\ddot{\theta}=T_c-T_{eff} \quad\quad\quad (Eq.\ 1)$$

Where $I_{eff}$ is the effective inertia about the crank axis, $\theta$ is the crank angle, $T_c$ is the crank torque generated by the user (i.e. the input torque) and $T_{eff}$ is the effective resistance torque. In the case of (chainless) human-electric hybrid vehicles with electronic transmission, the effective resistance torque is caused by frictional forces (in the bearings and in the transmission between the at least one pedal and the generator), by damping effects in the generator (such as eddy currents and hysteresis losses) and by the feedback torque (in generator or motor mode). Frictional forces can be known from measurements or calculations and are usually more or less constant. Losses in the generator typically depend on generator speed. Ohmic losses are proportional to the square of the currents occurring in motor or generator mode. Thus, with the effective inertia known (which may e.g. be set or calculated) and the crank torque being known from direct (e.g. by force or torque measurement on pedals and/or gear components) or indirect measurement (e.g. by measuring a generator current which is largely proportional to the torque), it is possible to determine a feedback torque for a desired cadence, angular acceleration or other quantity representing a reference trajectory.

In a further embodiment, the haptic renderer analyses the difference between a measured parameter, like angular position or angular velocity, and the corresponding "expected" parameter according to the reference trajectory. A counter torque or supporting torque may be proportional to the difference. It is also possible to combine several differences, e.g. of the angular position, the angular velocity and the sum (or integral) over several angular positions. While in this embodiment, the haptic renderer is configured for impedance control of the feedback torque, it is alternatively conceivable that admittance control is used.

The term "adapted" does not imply that the movement of the pedal has to follow the reference trajectory exactly. More generally, this means that the haptic renderer controls the feedback torque so that the movement either follows the reference trajectory or is guided towards it. In terms of control theory, the reference trajectory can be regarded as the setpoint or nominal value. As mentioned above, if the determined feedback torque is a supporting torque, its magnitude may be limited in order to provide an electronic freewheel. Other limitations to the feedback torque are possible, e.g. in order to prevent overload of mechanical components.

According to another embodiment, the inertia modeler is configured to adapt the reference trajectory based on at least one trajectory parameter. As mentioned above, the trajectory may be adapted according to the time that has passed since the beginning of its operation or the time since the user has started pedaling. In this case, the time is used as a trajectory parameter. Also, the current (average) cadence or the velocity (speed) of a vehicle driven by the pedal drive system may be a trajectory parameter. These parameters may for instance have an influence on the variation of the angular velocity about a mean value. In order to reproduce the behavior of a mechanical bicycle, where the angular velocity of the pedals becomes more and more constant with increasing velocity (mostly due to the increasing gear ratio and hence increasing effective inertia), the amplitude of oscillation of the angular velocity in the reference trajectory may be reduced with increasing velocity. This oscillation about a mean value may also be referred to as a "ripple". Other trajectory parameters may pertain to the current status of the user, like his heart rate or blood sugar level, or the current charge level of an energy storage device, such as e.g. a rechargeable battery.

Furthermore, it is possible that a user sets one or several parameters of the reference trajectory using a control device or interface device, which may be an onboard device of a vehicle that is powered by the drive system like a traditional digital tachometer or a mobile device like a smartphone, a PDA, a tablet or the like. For instance, the user may set a preferred cadence or the slope of a function representing the dependence of an average feedback torque on the (average) cadence or other parameters made available to the controller.

According to one embodiment, the inertia modeler is configured to:
  determine a past torque course for a predefined sampling time,
  determine a reference torque course, corresponding to the reference trajectory, for said predefined sampling time using a vehicle model,
  conduct a comparison of the past torque course with the reference torque course, and to
  determine an adapted pedal reference trajectory based on said comparison.

The past torque course represents the time evolution of the input torque applied to the pedal, i.e., the torque as a function of time. The torque may be determined by direct measurement using force sensors positioned in the pedal itself or at the crank connecting the pedal to its axis of rotation. In an embodiment, the torque is determined indirectly by measuring the electric current produced in the generator, which is essentially proportional to the torque.

The reference torque course corresponds to the reference trajectory and is determined or derived from the reference trajectory using a vehicle model. The vehicle model may according to one embodiment be a bicycle model. This may be the bicycle model mentioned above as represented by eq. 1 or another model that, when applied, allows to induce a haptic impression of high ergonomic quality at the at least one pedal. As shown by eq. 1, if the angular acceleration, the effective resistance torque and the effective inertia are known, the input torque can be calculated. The effective resistance torque and the effective inertia are known as model parameters, which may or may not be related to an actual vehicle which uses the pedal drive system. The effective resistance torque may be modeled using a variety of measured or indirectly deduced variables as input.

In an electric vehicle, the pedal(s) and the generator connected thereto do not contribute much to the effective inertia $I_{eff}$ and, since there is no mechanical coupling to a driven wheel, the effective (mechanical) inertia as such is rather small. However, it is possible to use eq. 1 as a model equation, where the effective inertia is "simulated" by a feedback torque. I.e., given a known input torque $T_c$, a resulting angular acceleration is calculated based on a "simulated" or "virtual" effective inertia, and this angular acceleration is used for the adapted reference trajectory.

In one embodiment, the ratio of the pedal cadence and the angular speed of a driven wheel is used to calculate a gear ratio, which in turn allows calculation of the effective inertia. Once the reference trajectory is determined, the resistance torque is adapted so that the pedal is guided towards or along the reference trajectory. As a result, the haptic feel for the user corresponds to a mechanical bicycle having an effective inertia equal to the simulated inertia.

Likewise, it is possible to use the effective resistance torque as a model parameter, and to display any driving situation or a "virtual world" via the reference trajectory and feedback torque.

For instance, it is possible to simulate an air resistance and/or a slope of a track on which a vehicle is going. These additional resistances may correspond to an actual situation of a vehicle which is driven by the pedal drive system, in which case (air) speed and slope can be determined directly by sensor measurements or can be determined indirectly, e.g. by calculating an (air) speed from the rotation frequency of a driven wheel. GPS measurements and maps also allow to estimate a slope which can be input into the model calculation. However, the abovementioned influences may also be simulated when using the pedal drive system in a stationary training apparatus.

Since the effective inertia and the effective resistance torque can be seen as parameters in a model equation, from which it is possible to calculate the angular acceleration, it is also possible to use the same parameters in the same equation to calculate a reference torque from the angular acceleration. The angular acceleration is either given directly by the reference trajectory or can be calculated, e.g. if the reference trajectory represents the angular velocity (cadence) by calculating the time derivative. Thus, it is possible to calculate a reference torque from the reference trajectory, which represents the "expected" pedaling behavior of the user. This reference torque is a theoretical input torque which the user would have to apply to keep the pedal motion on the reference trajectory if he was using e.g. a mechanical bicycle with the same effective inertia and effective resistance torque. However, since the haptic renderer tries to adapt the movement of the pedal to the reference trajectory, irrespective of the actual input torque, this input torque can be different from the calculated reference torque.

It should be noted that the reference torque course can be determined before or after the past torque course is determined, or even simultaneously in corresponding embodiments.

Once the reference torque course for the predefined sampling time has been calculated, it is compared with the past torque course for this sampling time. If the comparison shows that the past torque course is identical to the reference torque course (possibly except for negligible differences), the adapted reference trajectory may be unaltered. If the comparison shows that there are considerable differences, there are several possible embodiments as to the further control. One possibility is to use the past torque course as the basis for calculating a new reference trajectory, which in turn may be based on a vehicle model, e.g. using eq. 1. In this context, is also possible to base the new reference trajectory on an extrapolation of the input torque into the future. An analysis of the past torque course may be performed e.g. by identifying a non-oscillatory (e.g. linear or constant) component and periodic components. This would correspond to a "modified" Fourier analysis. For the future development of the input torque, the non-oscillatory component could be extrapolated and the periodic components could be added. Of course, other extrapolation techniques are possible. Any such extrapolation may reach into the future for a relatively small interval, like a few milliseconds or a few degrees of pedal arm travel. However, the interval may be larger, e.g. corresponding to a full 360° rotation of the pedal arm. In any case, the transition between the old reference trajectory and the adapted reference trajectory usually should be smoothened using suitable mathematical methods for trajectory generation such as splines, NURBS, Bezier curves, e.g. so that the angular position and its derivatives are continuous functions. The measurements of the above-mentioned courses will usually be noisy. Therefore, methods of digital signal processing like filtering may be applied, e.g. low pass filtering, i.e., mathematically speaking, elimination of high-frequency components.

Particularly, but not limited thereto, in the context of the above-mentioned embodiment, it is preferred that the inertia modeler uses a vehicle model which includes an effective inertia at the at least one pedal. In case of a rotational movement of the at least one pedal, the effective inertia is an effective rotational inertia. In an embodiment, the effective inertia may be a function of a virtual gear ratio. I.e., in a model calculation, a resistance torque and angular velocity at a driven wheel are modified (multiplied or divided, respectively) by the virtual gear ratio to determine the resistance torque and the angular velocity at the pedal. The corresponding parameters at the driven wheel do not have to correspond to real, physical values, but can be modified or can be completely artificial. In particular, the effective inertia may be a factor that connects the angular acceleration to the total torque at the pedal (see e.g. eq. 1). It should be kept in mind, though, that the effective inertia of the model has to be simulated and presented at the pedal to the user via the feedback torque generated by the haptic renderer. Thus, the effective inertia of the vehicle model can also be referred to as a "virtual inertia" or "virtual effective inertia". The virtual gear ratio may be a parametric curve using e.g. vehicle speed and/or pedaling torque etc. as a variable.

According to a further embodiment, the inertia modeler is configured to adapt the virtual gear ratio. This adaption may be performed in response to a user input or automatically, e.g. in order to keep the resistance torque and/or the angular velocity (or cadence) within a predetermined range.

In a further embodiment, the inertia modeler is configured to adapt the pedal reference trajectory so that the average pedal cadence converges to a preferred cadence value. The average pedal cadence can be calculated by averaging the pedal cadence over time, over crank angle etc. In this embodiment, the inertia modeler adapts the reference trajectory so that the average pedal cadence approaches the preferred cadence value. Once close, the inertia modeler (in collaboration with the haptic renderer that controls the feedback torque) keeps the actual average cadence close to the preferred cadence. For instance, when the user starts operation of the pedal drive system, the average cadence (or angular velocity) of the reference trajectory may initially, immediately after the pedal has started to move, be increased linearly so that it approaches the preferred cadence value rather quickly. As the preferred cadence value is approached, the average cadence may change from a linear increase to an exponential approach of the preferred cadence. Once the preferred cadence value has been reached and the user tries to exceed the preferred cadence value or other limits (like a maximum input torque that could be mechanically harmful), it is possible to change the feedback torque by increasing or reducing it such that the haptic feedback signals to the user to reduce the average cadence, or not to exceed an upper torque limit, or any other given limit.

In a simpler embodiment of the pedal drive system, where the reference trajectory is not adapted in response to the input torque, the inertia modeler may simply adapt the reference trajectory so that the average cadence is kept or converges towards the preferred cadence value.

This preferred cadence value may be input by the user. According to one embodiment, the control unit is configured to automatically adjust said preferred cadence value based on at least one state variable of the vehicle and/or the user. For example, the inertia modeler may be configured to make this (usually small) automatic adjustment. Examples for state variables of the vehicle include vehicle speed or a slope of the vehicle track. State variables of the user may be measured or be input by the user. The adjustment can be performed according to a parameterized model for preferred cadence. The display of the mobile device or a parameterization tool of the bicycle dealer allows to set the values of the parameters. In a further embodiment, the control unit is adapted to learn and (slightly) modify the preferred cadence automatically.

In one embodiment, the control unit is configured for controlling the feedback torque by iteratively performing the following steps:

determining a pedal state variable, representing a motion of the pedal;

calculating the difference between the determined pedal state variable and a corresponding state variable derived from the pedal reference trajectory; and adapting the feedback torque based on the difference.

The basic idea of this embodiment is to detect any deviation from the reference trajectory and to adapt the feedback torque in order to eliminate or at least diminish the deviation. According to an embodiment, the above-mentioned steps are performed by the haptic renderer. In a first step, a pedal state variable, which represents motion of the pedal, is determined. This may be, in particular, the angular position, the angular velocity and/or the angular acceleration of the pedal. In this context, the angular position also "represents a motion" in that it is due to a motion of the pedal starting from a known starting position. The pedal state variable may also be an integral or rather a sum over several values measured over a (time or crank angle) interval, like the sum over the angular positions measured over the last few milliseconds or the like. The pedal state variable may be measured directly via appropriate sensors or may be calculated according to sensor measurements.

The determined pedal state variable represents the actual state of the system, while a corresponding state variable, which can be derived from the reference trajectory, represents the setpoint of the system. In a next step, the difference between these two state variables is calculated. It should be noted that more than one state variable could be considered. For example, the difference for the angular position and the difference for the angular velocity could be considered and these differences could be combined e.g. in a weighted way.

In the next step, the feedback torque is adapted based on the difference. For instance, if the difference is zero or negligible, the feedback torque may remain unchanged. If, however there is a non-negligible difference, this indicates a deviation from the reference trajectory, which must be corrected by an increase or decrease of the feedback torque. In a simple, but usually effective embodiment, the change in the feedback torque may be proportional to the difference. In other words, the difference is multiplied by an appropriate factor to determine the change of the feedback torque. If several differences are considered, each difference may have a corresponding factor and the adaption of the feedback torque may be considered as a "linear combination" of the differences. However, there may be more sophisticated methods to determine the feedback torque, for example by using some convergence criterion, which also takes into account not only if there is a difference between the pedal state variables, but also if this difference is currently decreasing or increasing and, if it is decreasing fast enough.

Normally, the reference trajectory itself remains unchanged while these steps are performed. However, an adaption of the reference trajectory may be performed in between, which will of course influence the determination of the state variable in the second step.

While the above-mentioned embodiment relies on monitoring one or several pedal state variables, which represents motion of the pedal, the feedback torque may also be adapted based on the input torque. In this embodiment, the control unit is configured for controlling the feedback torque by iteratively performing the following steps:
 determining the input torque;
 calculating the difference between the determined input torque and a corresponding reference torque derived from the pedal reference trajectory; and
 adapting the feedback torque based on the difference.

As already mentioned above, a "theoretical" input torque can be calculated from the reference trajectory using a vehicle model, e.g. by applying eq. 1. The angular acceleration is easily derived from the reference trajectory, and with the effective inertia and the effective resistance torque known e.g. as model parameters, an input torque corresponding to the reference trajectory can be calculated, which is here referred to as the reference torque. Most of the time, the actual input torque is different from the reference torque, which necessitates compensating the difference by increasing or decreasing the feedback torque. However, it should be borne in mind that even if the actual input torque was equal to the reference torque (i.e. if the difference was always zero), the feedback torque may have to be adapted over time in order to guide the pedal along the reference trajectory.

Irrespective of whether the adaption of the feedback torque is based on a difference of state variables or on a difference of torques, it may be performed more or less regularly at short intervals. In terms of crank angle, the adaption may, in corresponding embodiments, occur at most every 5 degrees, at most every 2 degrees or at most every degree. In terms of time, the adaption may occur at most every 10 ms, at most every 5 ms, at most every ms or at most every 500 ns. It should be noted that a current controller collaborating with the haptic renderer may work at much higher frequencies of kHz to fractions of MHz.

In another embodiment, said at least one pedal reference trajectory comprises at least one alternating trajectory component having a period length that corresponds to a pedal revolution or half a pedal revolution. As already mentioned above, the angular velocity of the pedal in a mechanical bicycle is never exactly constant, but shows a ripple, i.e., an oscillation about a mean value. This results from the fact that a user can apply a torque to the pedal that depends on the present crank position. For example, if the crank is approximately positioned horizontally, it is easy for a user to apply a relatively large torque, while in other positions, the torque is rather limited. These variations of the torque also influence the angular velocity. Therefore, if such an oscillation or ripple is reproduced in a pedal reference trajectory, the user experiences a haptic sensation that is similar to that on a mechanical bicycle. The oscillation may be represented by the above-mentioned alternating trajectory component, which may be added to a constant or slowly changing "average" value. Normally, with two pedals, the user performs a more or less symmetric pedaling motion. In this case, the period length corresponds to half a pedal revolution. It is conceivable, though, that the motion is asymmetric, i.e., the motion of the right pedal does not correspond to the motion of the left pedal. Such asymmetric motion may be useful for rehabilitation training applications. In such a case, the period length corresponds to one pedal revolution. The alternating trajectory component may be periodic at least over a plurality of oscillations. However, it is possible that the amplitude and/or waveform of the alternating trajectory component changes with each oscillation. In general, the waveform does not have to be sinusoidal, corresponding to a single wavelength, but may comprise "upper harmonics", i.e., components with smaller wavelength. The amplitude of the alternating trajectory component is in an embodiment less than 10% of the current mean value of the trajectory (i.e., the value about which the trajectory is oscillating).

In one embodiment, the amplitude and the waveform of the alternating trajectory component depend on at least one state variable of a vehicle and/or the pedal. Examples for such a state variable include pedal position, cadence, speed of a vehicle driven by the pedal drive system or time (e.g. time that has passed since the beginning of operation of the drive system, or since the first half pedal revolution has taken place). As mentioned above, in a mechanical bicycle, the amplitude of the ripple decreases with increasing speed or with increasing gear ratio, respectively. In a bicycle with electronic transmission, the inertia modeler allows for a similar behavior by reducing the amplitude of the alternating trajectory component in a similar way as is known from power-assisted or non-power-assisted bicycles with a mechanical drivetrain. Likewise, the inertia modeler may decrease the amplitude of the ripple with increasing cadence.

According to another embodiment, the control unit comprises multiple pedal reference trajectories, which are alternatively selectable. I.e., several pedal reference trajectories are stored, e.g. in a library, and one of these may be selected either manually by the user or automatically. In particular, the haptic renderer or the inertia modeler may comprise the multiple reference trajectories.

The haptic renderer may be configured to select one of said multiple reference trajectories automatically based on a trajectory selection signal. This selection signal may be input by the user or it may be generated automatically. Such a signal may originate from a sensor that senses cadence and/or pedal torque, the slope of a track the vehicle is presently on, the drive torque on a driven wheel, the vehicle speed or other. To this respect, multiple reference trajectories for the pedal, which are selected depending on e.g. vehicle track slope, may be regarded as part of a reference plane. While a single reference trajectory is a graph in a 2D coordinate system (the coordinates being e.g. angular position and cadence), the reference plane is located in a 3D or even higher dimensional coordinate system (the coordinates being e.g. angular position, track slope and cadence).

As mentioned above, the inertia modeler is in an embodiment configured to iteratively adapt the at least one pedal reference trajectory at predetermined intervals. In further embodiments, these intervals correspond to less than one revolution of said pedal, in particular at most 10 degrees, at most 5 degrees or at most 3 degrees of rotation angle of said pedal. With typical cadence values, a 10-degree-rotation angle corresponds to about 3-30 ms. Thus, the adaption may be carried out at time intervals of about 1-30 ms. However, larger or even smaller time intervals are conceivable in corresponding embodiments. The necessary calculations for the adaption can be carried out on this time scale either on a local controller or by a suitable mobile computing device that is used to implement the inertia modeler. Thus, it is possible to adapt the reference trajectory with high angular and/or time resolution and the inertia modeler can adapt quickly to any changes of the pedaling behavior of the user.

In another aspect, an electric vehicle is provided, with a pedal drive system as described above, wherein an electronic transmission connects said generator to an electric load and/or an electric drive motor. The electronic transmission may comprise power electronics for the generator and/or the drive motor and an intermediate circuitry with at least one energy storage device. Such an energy storage device may be a battery, a fuel cell, a high-capacity capacitor and/or any other suitable current source. The main function of the energy storage device is to temporarily store surplus energy from the generator. However, it may also serve as a rechargeable energy source that can be charged via a power cable or, if the drive motor is operated as a generator during electrical braking, also surplus energy from the motor may be stored in the energy storage device. It is understood that such an electric vehicle has at least one driven wheel, which is mechanically connected to the drive motor. For effective traction control and in an embodiment, the torque and/or the angular velocity at the driven wheel is not influenced by any ripple present in the torque and/or angular velocity of the pedal. In other words, the torque at the driven wheel is preferably constant or changes monotonously over one pedal revolution. If the reference trajectory is determined based on a bicycle model, the virtual effective inertia and the effective resistance torque may be based on real physical parameters of the bicycle. I.e., the real mass of the bicycle and the user may be used as a basis for calculating the virtual effective inertia, while air resistance (based on the current speed of the bicycle), slope of the driving surface and other parameters may be used as a basis for calculating the effective resistance torque.

Possible embodiments of the above-mentioned vehicle correspond to embodiments of the inventive pedal drive system.

In yet another aspect, a training apparatus is provided, with a pedal drive system as described above. In such a training apparatus, the energy generated in the generator is usually just dissipated and converted into heat. Normally, there is no driven wheel, although it is conceivable that the generator is coupled to a drive motor, which in turn is coupled to a flywheel. In contrast to a bicycle, there are no real physical parameters on which the virtual effective inertia and the effective resistance torque can be based (although one could calculate the effective inertia based on the mass of the apparatus and the user). Commonly, if a bicycle model is used to determine the effective inertia and the resistance torque, these parameters can be chosen more or less arbitrarily. In particular, the resistance torque can be modeled based on a "virtual" track.

Possible embodiments of the above-mentioned training apparatus correspond to embodiments of the inventive pedal drive system.

In another aspect of the invention, a method of operating a pedal drive system for generating electrical power from muscle power of a user is provided, with at least one pedal and an electric generator, which is connected mechanically with said at least one pedal, wherein a feedback torque, applied at said pedal, is controlled based on at least one pedal reference trajectory. The generated electrical power may be used locally or may be fed into the electrical grid.

These terms have been explained in detail above in context with the inventive pedal drive system. It is understood that in the context of this method, the pedal drive system may comprise a control unit, which in turn comprises a haptic renderer, and the feedback torque may be controlled by the haptic renderer of the control unit. Possible embodiments of the above-mentioned method correspond to embodiments of the inventive pedal drive system.

According to yet another aspect, an electric drive system for a vehicle is provided, which is operated with muscle power and comprises at least one pedal, an electric generator, connected mechanically with said at least one pedal, an electric drive motor, connected electrically with said electric generator, and a drive controller, wherein said drive controller is configured to determine a maximum acceleration value of the vehicle according to a predefined relationship based on at least two current vehicle state parameters, determine a desired vehicle acceleration based on a pedaling performance of a user, and operate the electric drive motor so that the vehicle acceleration is limited by the determined maximum acceleration value.

Unless otherwise noted, like terms correspond to those explained above in context with the inventive pedal drive system.

The electric connection between the motor and the generator may be achieved by an electronic transmission as mentioned above, which may comprise power electronics for the generator and/or the motor and an intermediate circuitry with at least one energy storage device. It is understood that part of the electrical power for the drive motor may be taken from the energy storage device, which may have been charged externally by a connection to the power grid. In a vehicle, at least one driven wheel is mechanically connected to the drive motor.

The drive controller, which may be implemented as hardware and/or software, is configured to determine a maximum acceleration value of the vehicle. This maximum acceleration value is an acceleration limit which is not to be exceeded. Reasons for such limitation may pertain to operating safety of the vehicle (e.g. preventing slip of a driven wheel), power management of an energy storage device, legal speed limits, etc. It should be noted that the maximum acceleration value can be negative in some cases, thus representing a deceleration. The maximum acceleration value is not fixed, but depends on at least two current vehicle state parameters (wherein the term "current" is to be understood to include embodiments where the parameters are used with some time delay that is inevitable and/or considered to be irrelevant). In other words, the maximum acceleration value can be represented by a plane in a 3D coordinate system with two coordinate axes representing the two vehicle state parameters. If it depends on more than two vehicle state parameters, it can be represented by a hyperplane in a higher dimension coordinate system.

The drive controller may either calculate the maximum acceleration value in real time based on a corresponding formula or it may read the value from a lookup table, database, library, etc. The formula, the lookup table, database, or the library, respectively, represent the predefined relationship according to which the maximum acceleration value is determined. The vehicle state parameters are representative of a current vehicle state. They may e.g. pertain to the motion of the vehicle, its location or the properties of the track. In general, there are many possibilities for selecting such parameters, as long as there is a reasonable connection between a given parameter and an acceleration limit.

Also, the drive controller is configured to determine a desired vehicle acceleration based on a pedaling performance of a user. In general, this can be done before, after or simultaneously with determining the maximum acceleration value. The concept is that the pedaling performance of the user is "interpreted" as a desire to accelerate or decelerate. The pedaling performance may be assessed e.g. based on angular velocity (or cadence), input power or input torque. According to one or several predefined rules, the drive controller deduces a desired vehicle acceleration from the pedaling performance.

However, this desired vehicle acceleration may only correspond to an actual vehicle acceleration if it does not exceed the maximum acceleration value. Therefore, the electric motor is operated so that the vehicle acceleration is limited by the determined maximum acceleration value. It should be noted, though, that in some cases the maximum acceleration value may be exceeded unintentionally, though, due to unforeseeable influences (e.g. an abrupt change of the vehicle tracks slope, a sudden tailwind or the like). However, since the controller usually adapts very quickly, e.g. within fractions of a second, a feasible value for acceleration is normally reached by ramping down very fast.

According to an embodiment, the drive controller is configured to
  compare a performance parameter, which is characteristic of a current pedaling performance of the user, with a predefined reference parameter,
  determine the desired vehicle acceleration corresponding to the difference between performance parameter and the predefined reference parameter.

The performance parameter may be e.g. the power input by the user or the input torque. This performance parameter is compared with a reference parameter. The reference parameter may be predefined before operation of the vehicle starts or it may be based on past pedaling performance of the user. For instance, if the performance parameter is the input torque, the reference parameter may be the input torque during a previous rotation of the pedal. For example, if the user has been pedaling with a certain maximum input torque during one or several rotations of the pedal, this maximum input torque may be used as a reference parameter. If the user starts pedaling more forcefully, i.e., if he applies more input torque, this can be interpreted as a desire to accelerate, which is found by comparing the current input torque with the reference parameter (i.e. the past input torque). According to another example, the reference parameter may be a reference input power. If the current input power exceeds the reference input power, this can be interpreted as a desire to accelerate the vehicle. It is to be understood that while the desired vehicle acceleration is determined corresponding to the difference between the performance parameter and the predefined reference parameter, the desired vehicle acceleration does not necessarily depend linearly on this difference. In particular, if the difference is small, although nonzero, the desired vehicle acceleration may be determined to be zero, though.

In an embodiment, the at least two vehicle state parameters comprise at least vehicle speed and vehicle track slope, so that the maximum acceleration value is determined as a function of at least vehicle speed and vehicle track slope. "Vehicle track slope" of course refers to the inclination of the driving surface of the vehicle. One of the ideas here is to limit the maximum acceleration more and more as the speed increases, which usually leads to a limitation of the vehicle speed itself. For instance, if the maximum acceleration value decreases with increasing speed and becomes zero for a predefined "speed limit", this mostly prevents the vehicle from exceeding this limit. The maximum acceleration value can be negative for higher speeds. In this case, the drive motor could start to brake electrically, and hence recuperate kinetic energy. One reason for such a speed limit can be traffic regulations and/or safety precautions. Another reason may be that due to increasing air drag, it becomes difficult to accelerate above a certain speed without excessively draining an energy storage device.

For the same reason, it may be useful to limit the maximum acceleration with increasing track slope. Of course, the energy consumption at the drive motor increases with increasing track slope, even if the vehicle only maintains a certain speed. Trying to accelerate will increase the total energy consumption even more so that it may have to be limited. In this way it is possible to limit the total drive torque required at the at least one driven wheel caused by air drag, downhill-slope force and acceleration force to a certain maximum value. Thus, the maximum acceleration value would be dependent on the vehicle speed and the vehicle track slope. Another option would be to limit the acceleration in order to prevent slipping of the driven wheel. In such a case, it is conceivable to not only include the track slope but also the friction coefficient between the driven wheel and the track, which may be determined based on GPS-based information on the track surface (asphalt, gravel, dirt etc.) and/or weather data (dry/wet/icy underground). These, however, are just examples and there are many other possibilities how the maximum acceleration value can depend on vehicle speed and vehicle track slope.

In one embodiment, the at least two vehicle state parameters comprise at least speed limit information, based on the current location of the vehicle. In such an embodiment, the drive controller can be connected to a GPS module and/or may have access to a database that links the vehicle position to a local (or national) speed limit. Thus, a speed limit as mentioned above is not static but can be determined depending on the vehicle position. As mentioned above, the maximum acceleration value may become zero if the vehicle speed reaches the speed limit. Alternatively, a speed limit may be input by the user or could even be determined by an image recognition software that "reads" traffic signs.

In another aspect of the invention, an electric vehicle is provided, with an electric drive system as described above.

As mentioned above, the total power for the drive motor is generally a combination of generator power, that is mechanical power by the user minus losses in the generator, gear and power electronics associated with the pedal generator, and power from a rechargeable energy storage device like a battery. Unless the energy storage device is totally drained, there are several options how the necessary drive power can be obtained. In an embodiment, the percentage of the power generated by the user in relation to the total required drive power is changed gradually as a function of the current from the energy storage device. For example, the percentage may almost be constant (e.g. 40%) within a certain range, e.g. when the battery current is between 0 and 3 times the nominal current. When the battery current increases further, the percentage may also increase steadily, e.g. according to a polynomial function, up to 100% (which may be reached for example when the battery current is 5 times the nominal current). If the battery current becomes negative, i.e. if energy is recuperated, the percentage of the user's contribution to propulsion may be decreased steadily, e.g. according to a polynomial function. In any case, the percentage should not change abruptly (i.e. contain "jumps") as a function of the battery current.

Reference will now be made to the drawings in which the various elements of embodiments will be given numerical designations and in which further embodiments will be discussed.

Specific reference to components, process steps, and other elements are not intended to be limiting. Further, it is understood that like parts bear the same reference numerals, when referring to alternate figures. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a schematic representation of components of an electric vehicle 100 according to one embodiment. In particular, this may be a bicycle. It is understood that for sake of clarity and simplicity, many components of the vehicle 100 are not shown. The vehicle 100 comprises a pedal drive system 10 and an electric drive system 20. The pedal drive system 10 comprises two pedals 11, which are mechanically connected by a crank 12 to an electric generator 13. While the mechanical connection is shown in simplified form, it is understood that such a connection could feature some kind of transmission mechanism. The electric generator 13 is connected to first power electronics 14, which in turn are connected to a control unit 30.

On the one hand, the control unit 30 receives information on the operation of the pedals 11 via the first power electronics 14 from a first sensor unit 40. Such information—which may also be used by the first power electronics 14—may in particular comprise information on an input torque applied by a user, and angular position of the crank 12, an angular velocity (or a cadence, respectively) and/or other quantities. It should be noted that while the input torque could be measured by dedicated force sensors on either pedal, pedal arm, or gear components, which may be part of the first sensor unit 40, in this exemplary embodiment, the input torque is determined by measuring the current from the generator 13, which, for some types of electrical machines, e.g., DC machines or PMSM machines, is proportional to the input torque. Quantities pertaining to the position of the crank 12 may be determined by the first sensor unit 40, which comprises an angular encoder.

On the other hand, the control unit 30 can send a control signal to the first power electronics 14 in order to control a feedback torque that is applied to the crank 12 and the pedals 11 by the generator 13. In particular, the control unit 30, which may at least partially be implemented in software, comprises a haptic renderer 31, which is configured to control the feedback torque based on a predefined pedal reference trajectory. Such a pedal reference trajectory, which will be discussed in more detail below, may for example represent a nominal value for the cadence (or angular velocity) as a function of the angular position. In other words, the haptic renderer 31 controls the feedback torque so that the actual cadence corresponds to the reference trajectory. Alternatively, the reference trajectory could represent a nominal value for the angular position and/or any of its time derivatives. Of course, the haptic renderer 31 either comprises or is connected to a memory device (not shown), in which the reference trajectory is stored. Usually, the feedback torque is a counter torque, i.e., a torque that counteracts the input torque applied by the user. One could say that the counter torque and the reference trajectory, on which it is based, simulate a "virtual" inertia of the vehicle 100. The actual, physico-mechanical inertia of the pedals 11, the crank 12 and the generator 13 is comparatively low, so that the haptic feeling of a user operating the pedals 11 largely depends on the feedback torque. If possible, the feedback torque is generated by operating the generator 13 normally, i.e., as a generator. However, the feedback torque may also be generated by operating the generator 13 as a motor. This operation mode may also be employed to generate a supporting torque, i.e., a torque that acts in the same direction as the input torque applied by the user, or a hold torque to e.g. support the weight of the leg and foot before starting. The control unit 30 also comprises an inertia modeler 32, which is configured to iteratively adapt the reference trajectory which is then provided to the haptic renderer 31. Operation of the inertia modeler 32 will be described in detail below.

The control unit 30 is also connected in a wired manner or wirelessly to a human-machine interface 60, which may be integrated into the vehicle 100 or may be a mobile device like a smartphone or smartwatch, a PDA or a tablet. A user may input certain parameters via the human-machine interface 60 or may just specify his identity, whereafter certain parameters are automatically determined. Of course the human-machine interface 60 may also serve as a display for the user, where current values of vehicle speed, cadence, pedal power, etc. are shown, and/or allow remote diagnosis of the vehicle 100.

The pedals 11, the generator 13 with the first power electronics 14 and the control unit 30 are also part of an electric drive system 20 of the vehicle 100. This electric drive system 20 further comprises an electric motor 21, which is coupled to second power electronics 22, which in turn are connected to the control unit 30. The electric motor 21 is mechanically connected to at least one driven wheel 23. It may either be directly connected to the hub of the driven wheel 23 or via a transmission mechanism. The second power electronics 22 are also electrically connected to the first power electronics 14 and to an energy storage device 50 for energy exchange. The energy storage device 50 may, e.g., be a rechargeable battery, a capacitor, or a combination of both. Also, a current source like a fuel cell may be combined with an energy storage device like a battery with low impedance. Normally, energy will be transferred from the first power electronics 14 and/or the energy storage device 50 to the second power electronics 22. However, the electric motor 21 may also be employed as a generator, e.g. when the vehicle 100 is going down a slope, so that energy can be transferred from the second power electronics 22 to the first power electronics 14 and/or to the energy storage device 50.

The control unit 30 further comprises a drive controller 33, which controls the second power electronics 22 in order to achieve a certain drive torque and/or a certain angular velocity or angular acceleration at the driven wheel 23. Operation of the drive controller 33 will be described in more detail in the following. The control unit 30 also receives information on the electric motor 21 or the driven wheel 23 via the second power electronics 22 and/or a second sensor unit 41. Such information—which may also be used by the second power electronics 22—may refer to the drive torque, the angular velocity or other characteristic quantities.

Alternatively, the control unit 30 could receive this information directly, i.e., not via the second power electronics 22.

It should be noted that while the first and second sensor unit 40, 41 are each shown as a single, localized device, each of them can be a group of sensors that are spaced apart. Beside this, the vehicle may comprise a third sensor unit 42, which is neither located near the generator 13 nor near the electric motor 21. Sensor unit 42 may be located at any suitable location on the vehicle 100 or the user. Examples for such sensors are GPS sensors, inclination sensors, heart rate sensors for the user, etc. The sensor units 40, 41, 42 can be connected by wires or wirelessly. They can be connected to a serial bus so that bidirectional information exchange, e.g., so that re-parameterization is possible.

Figure 2:
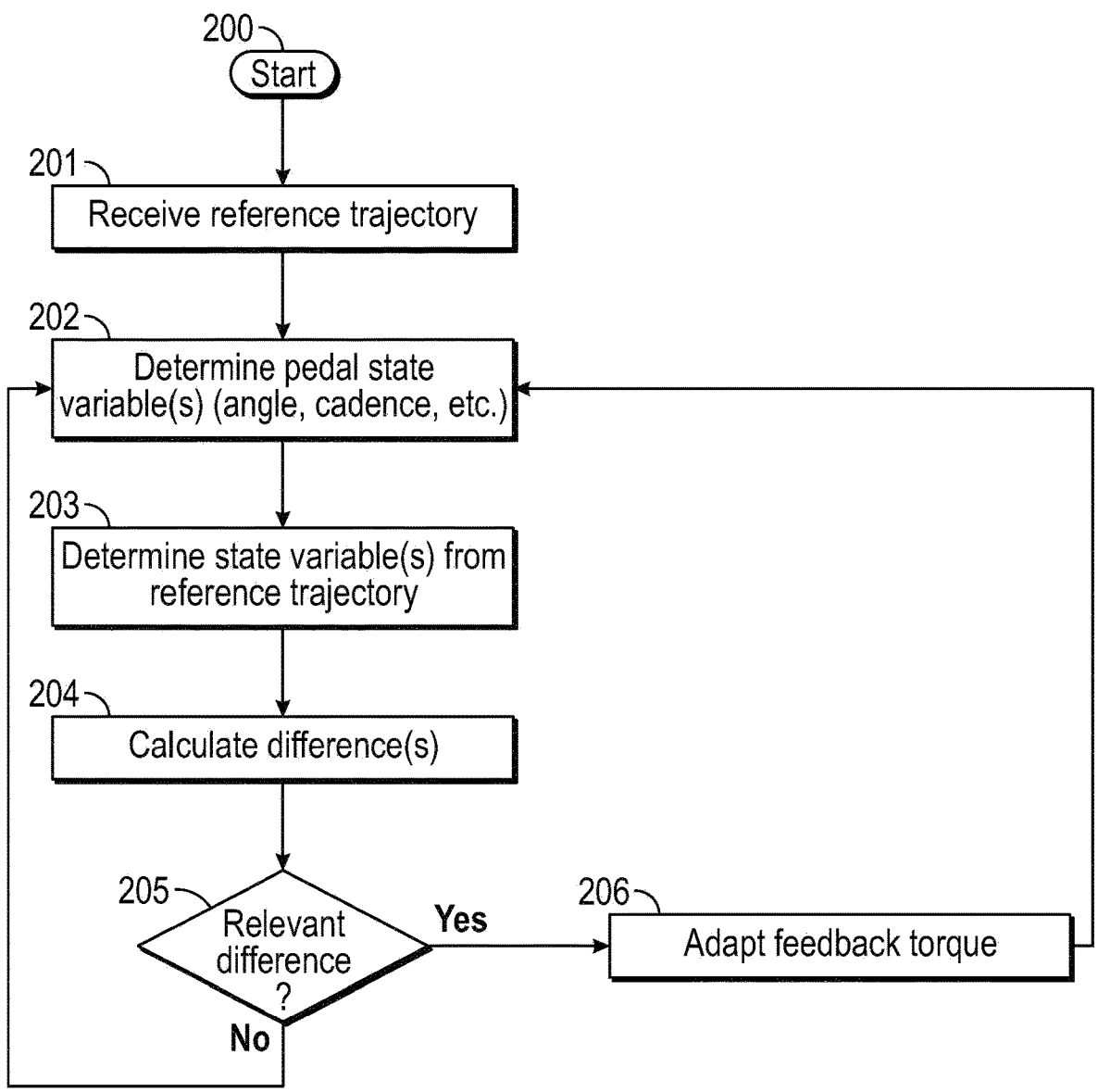
FIG. 2 is a flow diagram showing the adaption of a feedback torque.

Referring to FIG. 2, a method for controlling the feedback torque according to a reference trajectory will be described. The method is conducted by the haptic renderer 31. After starting at step 200, a reference trajectory, which may be provided by the inertia modeler 32 or by a trajectory library of the control device 30 (not shown, but discussed in more detail in the following), is received at step 201. In step 202, one or several pedal state variables are determined, which may be the angular position, a sum over angular positions, the angular velocity or the angular acceleration of the pedals 11 (or generator 13, which, normally, is connected to the pedals 11 with a fixed gear ratio which can be known to the control unit 30. A variable gear ratio is an option.). In step 203, the corresponding state variable(s) are derived from the reference trajectory. If necessary, numeric integration or numeric differentiation can be employed to determine the respective state variable. For instance, if the pedal state variable is an angular velocity and the pedal reference trajectory defines an angular acceleration, the angular position first has to be calculated by integration.

In step 204, the difference between each actual state variable and the corresponding state variable derived from the pedal reference trajectory is calculated. In step 205, it is checked whether any of the differences calculated in step 204 is relevant, i.e. non-negligible. If so, the feedback torque is adapted in step 206 and the procedure is repeated with step 202. The feedback torque may be increased by an amount that is a linear combination of the differences calculated in step 204. I.e., if there is only one difference, the increase of the feedback torque is proportional to this difference. If there is no relevant difference—which will be rarely the case—the procedure immediately goes back to step 202 without adapting the feedback torque. Usually, methods common in signal processing for noise reduction are applied before the calculation in step 204 in order to get the pedal state variables in good quality.

It should be noted that some steps that are shown sequentially may temporally occur in parallel, i.e., at the same time. E.g., steps 202 and 203 may be performed in parallel during the same time interval. Such parallelization can help to increase the frequency of the feedback torque adaption.

Now, with reference to the flow diagram of FIG. 3, the adaption of a reference trajectory by the inertia modeler 32 will be described. After the start in step 300, the inertia modeler in step 301 reads or calculates initial parameters, like an effective inertia, an effective resistance torque etc. These parameters may be stored in the memory device. The initial parameters may also be determined based on a user selection or may be calculated based on sensor readings. In step 302, the inertia modeler calculates a reference trajectory using a vehicle model. If there is no data available on the pedaling behavior of the user (such as for example the input torque), a standardized reference trajectory is used. Here, it is also possible that the reference trajectory is selected from multiple reference trajectories stored in the trajectory library of the control unit 30. Next, in step 303, the pedal is guided along the reference trajectory. That is, the reference trajectory is provided to the haptic renderer 31, which in turn controls the feedback torque accordingly, e.g., as described with reference to FIG. 2. At the same time, the input torque $T_c$, or rather its evolution over time or angular position, is measured and stored for future reference. As shown with reference to FIG. 2, step 303 actually contains a loop, which may be performed for e.g. a few milliseconds before the method continues with step 304. In this step, it is checked whether the user has stopped pedaling forward, which may be detected e.g. by a relatively abrupt decrease of the input torque $T_c$. It should be noted that such a check could also be included in the loop of FIG. 2. If the user has stopped pedaling forward, the method continues with step 305 and enters a freewheeling mode. In this mode, the pedal 11 is no longer guided along a reference trajectory (which may otherwise contravene the user's will), but it is allowed to decelerate and stop or even to be moved backwards. This process of slowing down can happen in a torque control mode, or according to a newly calculated or retrieved reference trajectory which governs the slowing down process. In contrast to a mechanical bicycle, where the pedal 11 is either completely coupled or decoupled, it is possible to work in an "intermediate" mode, where the pedal 11 is partially coupled. This means that as the pedal 11 is decelerating, the user still feels some resistance torque from the electric generator 13, while kinetic energy from the user's legs is recuperated. If in step 304 it is being detected that the user moves the pedal 11 backwards, the generator 13 is operated as a motor to assist the intended motion of the pedal. This state of operation may be used to move the pedal 11 into an ideal starting position. There, a holding/clamping torque can be applied e.g. if a brake lever is pulled by the user.

If the user has not stopped pedaling forward, the method continues with step 306, where parameters are updated. Such parameters may include the (virtual) effective inertia and the effective resistance torque. The latter may depend on a vehicle tracks slope and/or a vehicle speed (which influences the air drag). In particular, it is possible to adapt the virtual gear, either automatically or in response to a user input. For instance, the virtual gear may be adapted so that the user is encouraged to reach a preferred cadence value (or is deterred from deviating from such a preferred cadence value).

During step 303, the input torque has been recorded in order to obtain a past torque course of the input torque at the pedals 11. This torque course represents the time evolution of the torque over a certain sampling time, which may be e.g. between 1 and 100 ms. Using a vehicle model with an appropriate equation of motion (e.g. eq. 1), a reference torque course is calculated, which is derived from the pedal motion represented by the reference trajectory. This reference torque course represents the "expected" input torque during the sampling time. In step 307, the past torque course is compared with the reference torque course. If there is a relevant difference, which will usually be the case, the reference trajectory is adapted in step 308. Here, it is optionally possible to extrapolate the past torque course into the future and use the equation of motion to calculate a reference trajectory corresponding to this extrapolation. However, the transition between the "old", unadapted reference trajectory and the "new", adapted reference trajectory usually is smoothened by suitable mathematical methods, e.g. using splines. According to an embodiment, the adaption of the reference trajectory is performed at relatively short intervals, like every 1-100 ms or every 1°-10° of rotation of the pedals 11. Once the reference trajectory has been adapted, the method goes back to step 303. In the (rare) case that there is no relevant difference between the past torque course and the reference torque course, the method immediately goes back to step 303 without adapting the reference trajectory.

It should be noted that in a simplified embodiment, the input torque may not be measured in step 303 and the check at step 307 may be omitted. In this case, the reference trajectory is independent of the pedaling behavior of the user. Of course, the adaption in step 308 in this case is also independent of the input torque. As in FIG. 2, some steps that are shown sequentially may be performed in parallel, i.e. at the same time. This may be done asynchronously or synchronously, depending on the actual implementation of the embodiment. E.g., temporally, step 306 may take place in parallel to step 303.

Figure 4:
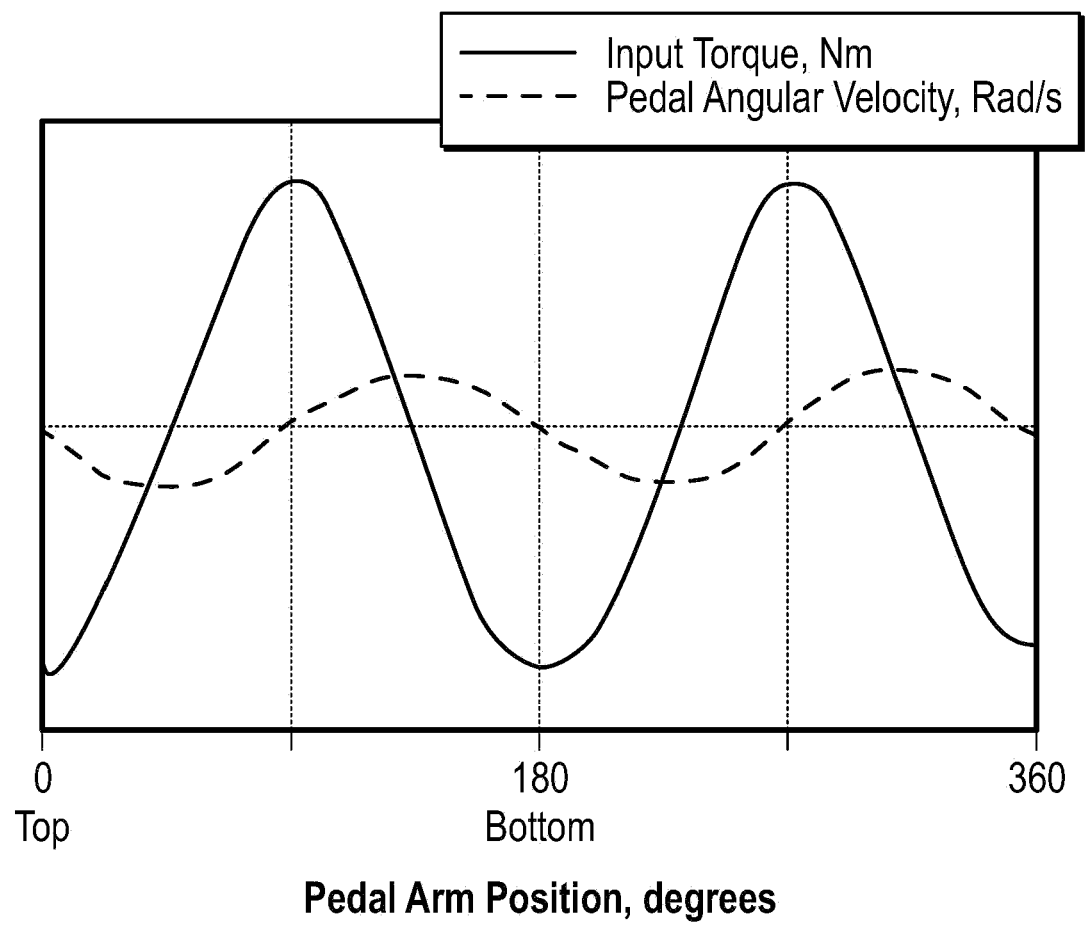
FIG. 4 is a diagram illustrating the evolution of an input torque and an angular velocity over crank angle.

FIG. 4, by way of example, illustrates the development of an input torque and an angular velocity as a function of the crank angle. The full width of the diagram represents a 360° rotation of the crank 12. The input torque during this period has two peaks within this interval, which is due to the presence of two pedaling legs and two pedals 11, which move with an approximate or exact 180° phase shift. The data shown here represent one revolution of the cranks 12, which are 180° apart. The input torque $T_c$ for a first revolution is roughly sinusoidal and in this case has maximum values close to or at 90° and 270° pedal position, and minimal values at 0°, 180° and 360°. The angular velocity or cadence for this revolution is proportional to the integral of the total torque, which apart from the input torque comprises the feedback torque applied by the haptic renderer 31. The cadence is also roughly sinusoidal, and has a 45° phase shift with respect to the input torque. The cadence could be used as a reference trajectory for the following revolution of the crank 12. As indicated by the horizontal line, the cadence oscillates about an average value. If the cadence is considered as a reference trajectory, this reference trajectory would be composed of a non-oscillatory (e.g. constant or linear) component and an alternating trajectory component or "ripple". Such a structure can also be used in a case where the inertia modeler only partially bases the reference trajectory on the pedaling behavior of the user, but uses a more or less realistic model function. The alternating trajectory component or ripple shown here is roughly sinusoidal. However, it also comprises components having shorter wavelengths, which may be regarded as upper harmonics. In the present case, the average value of the angular velocity is constant over the whole revolution of the crank 12, but it could also be changing more or less slowly.

Figure 5:
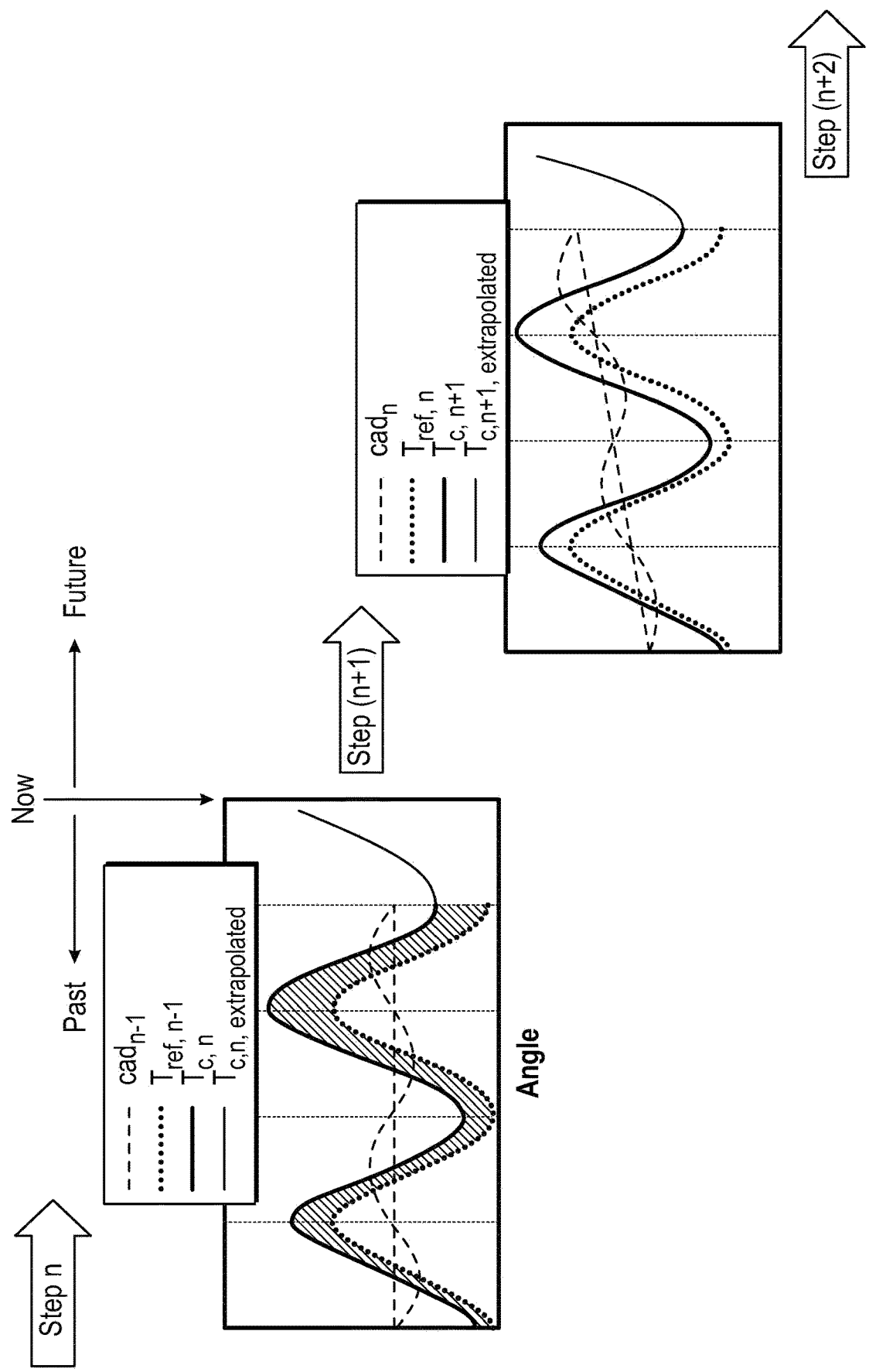
FIG. 5 is a diagram showing the development of an input torque and the adaptation of a reference trajectory.

FIG. 5 illustrates the adaption of the reference trajectory in response to the input torque $T_c$ applied by the user. It should be noted that all quantities here are shown as a function of the crank angle. Given as a function of time, the corresponding curves would be deformed, due to the non-constant angular velocity. In the diagram on the left, representing step n, the cadence $cad_{n-1}$ of the reference trajectory is alternating about a constant average value. The index "n−1" indicates that this reference trajectory was calculated based on the previous step n−1. It should be noted that since the haptic renderer 31 guides the pedal 11 along the reference trajectory, the cadence $cad_{n-1}$ of the reference trajectory is more or less identical to the actual cadence. The bold dotted line indicates a reference torque $T_{ref,\,n-1}$, which is calculated from the cadence $cad_{n-1}$ using a vehicle model. However, the actual input torque $T_{c,\,n}$ during step n normally does not correspond to the expected value. In the shown example, it has a larger value over the entire 360° revolution. Due to the feedback torque applied by the haptic renderer and due to the virtual inertia applied, this larger input torque does not (immediately) lead to an increasing cadence, though. However, the increased input, which is indicated by the shaded area, still leads to additional energy generation in the generator 13, which may either be transferred to the motor 21 or stored in the energy storage device 50.

Figure 3:
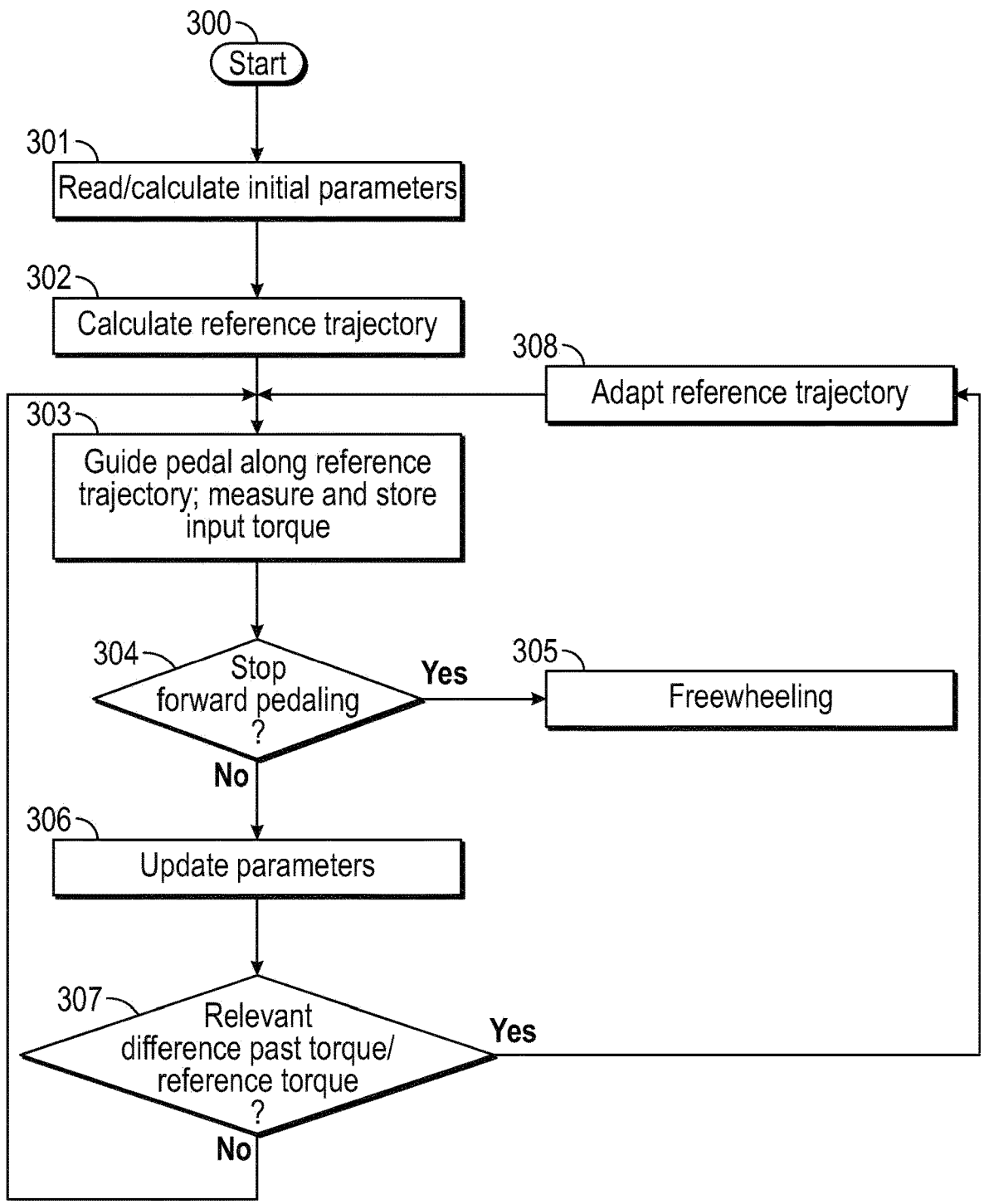
FIG. 3 is a flow diagram showing the adaption of a reference trajectory.

Now, in the transition from the left to the right diagram (which represents the future crank angle), the reference trajectory is adapted as in step 308 of FIG. 3. Basically, the vehicle model is applied and allows the derivation of an adapted reference trajectory. Due to the fact that $T_{c,n}$ is higher than $T_{ref,n-1}$ (the difference being the shaded area) the wish of the user to accelerate is detected. So the average cadence of the new reference trajectory, $cad_n$, accelerates.

As indicated by the fine full line in the diagram on the left, the input torque can optionally be extrapolated, which corresponds to the bold dotted line in the diagram on the right hand side. Here, the extrapolated input torque $T_{c,n,\_extrapolated}$ can be considered as the new reference torque $T_{ref,n}$, which can be used to calculate the cadence $cad_n$ of the new reference trajectory. As can be seen, due to the increased input torque in step n, the cadence $cad_n$ is increasing and in particular has an increasing average component (in addition to an alternating component). The transition between the cadence in step n and the cadence in step n+1 may be optionally smoothened by appropriate mathematical methods e.g. using splines. By way of example, the input torque $T_{c,\,n+1}$ during step n+1 is shown, which again exceeds the reference torque $T_{ref,n}$. For the next step n+2, the input torque $T_{c,\,n+1}$ may again be extrapolated $T_{c,n+1,extrapolated}$ as indicated by the thin solid line and can be used to calculate the cadence for the next reference trajectory.

Figure 6:
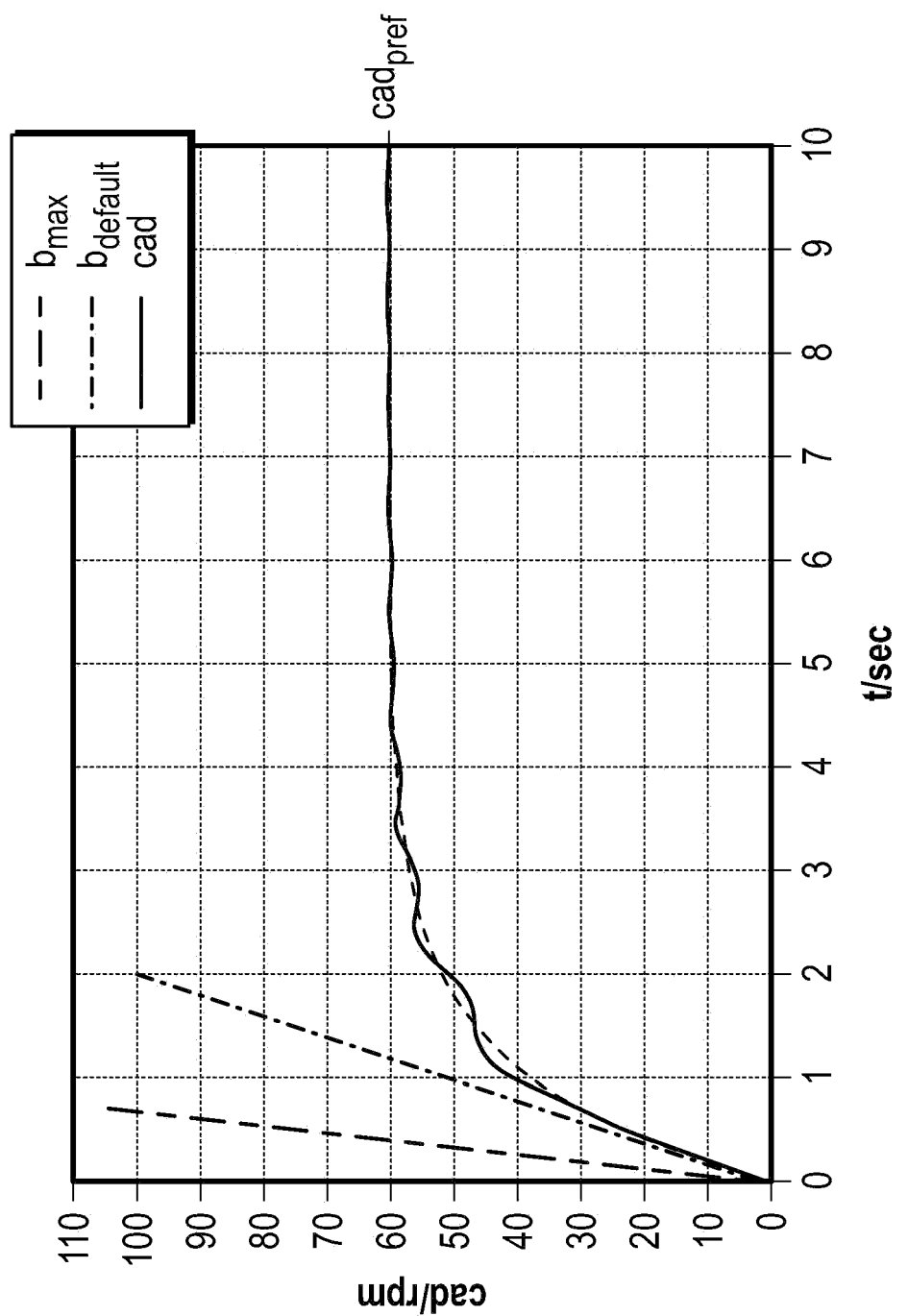
FIG. 6 is a diagram illustrating the time evolution of a cadence after starting operation of the vehicle.

FIG. 6 illustrates the time evolution of the cadence after starting operation of the vehicle 100. Here, the time since the start of operation may serve as a trajectory parameter for the inertia modeler 32. As can be seen in the diagram, the cadence of course starts from zero and within a few seconds converges to a preferred cadence $cad_{pref}$ (in this example, 60 rpm), which may be a default value or may be determined by a user input. It represents a cadence that is considered most efficient and/or most convenient for the user. The cadence starts to increase according to a predefined angular acceleration $b_{default}$, which may be determined by a user input. In any case, this acceleration is limited for security reasons by a maximum allowed acceleration $b_{max}$. As indicated by the fine dashed line, the cadence comprises a relatively slowly changing "average" component and an alternating component or ripple, which is added to the average component. Optionally, the alternating component may be set to be zero for an initial time period e.g. during the time needed for the first half pedal revolution before it takes on a relatively large amplitude. After that, as the average component increases and approaches the preferred cadence, the amplitude of the alternating component decreases. In other words, the cadence becomes more and more constant. This corresponds to the behavior of a mechanical bicycle, which allows steadier pedaling at higher velocities, partially as a result of a higher gear ratio and higher effective inertia. If the reference trajectory is adapted according to the pedaling behavior of the user, e.g. as described with reference to FIG. 3, it may be not be possible to realize an idealized evolution of the cadence as shown in FIG. 6, since the user has some influence on the cadence. However, even in such a case, the inertia modeler influences the pedaling behavior, e.g. by adapting the virtual gear, so that the user is encouraged to pedal slower or faster. It should be noted that as the cadence increases in FIG. 6, the angular velocity of a driven wheel usually also increases, although usually at a different rate. Since there is no mechanical transmission between the generator and the electric motor, the operation of the electric motor, connected with the driven wheel, is largely independent of the pedaling behavior. In particular, the angular velocity of the electric motor in one embodiment comprises no ripple at all. Although there is no mechanical transmission, the fact that the cadence is more or less constant after a few seconds, while the vehicle 100 may still be accelerating, can be regarded as a result of a changing virtual gear ratio, which in turn influences a virtual inertia. It should be noted that while in a mechanical bicycle, there is a limited number of gear ratios, the virtual gear ratio can be adjusted continuously, which results in the possibility of a mostly constant cadence. The preferred cadence $cad_{pref}$ can be selected according to a user input, but it may also be adjusted automatically by the control unit 30 (e.g. by the inertia modeler 32) according to a state variable of the vehicle or the user.

Figure 7:
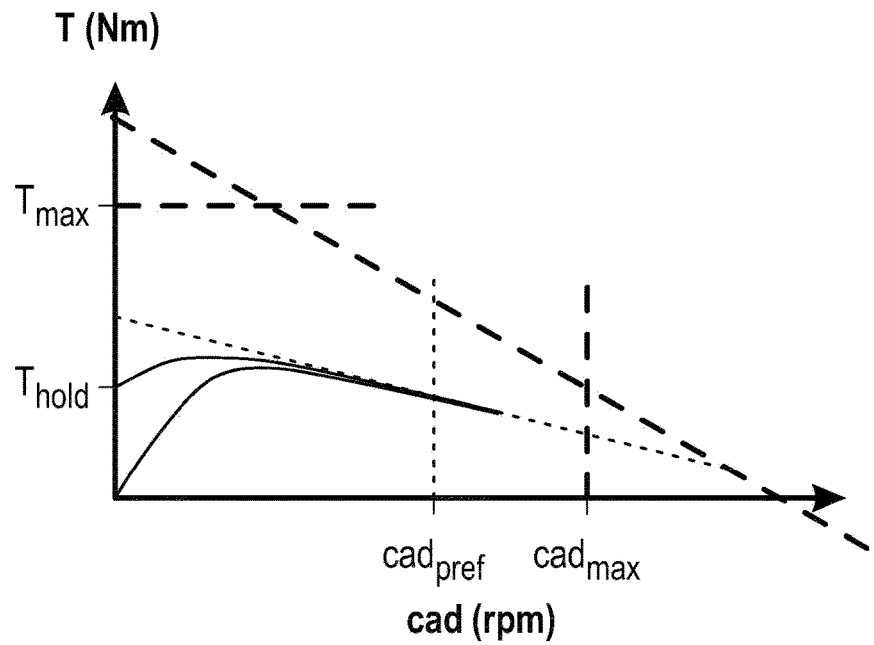
FIG. 7 is a diagram illustrating the dependency of an average input torque as a function of an average cadence.

FIG. 7 shows the dependency of the average input torque as a function of the average cadence. Here, both averages may be e.g. over time or over crank angle. Due to the limits of the mechanical stability of the pedals 11, the crank 12 and a gear (if present) and/or the electrical limits of the generator 13, the input torque has an upper limit $T_{max}$. Also, for several reasons such as voltage limitation, inverter topology, mechanical integrity of rotating components in the generator or its gear, the cadence has an upper limit $cad_{max}$. The preferred cadence $cad_{pref}$ (indicated by the vertical thin dashed line) of course is below this upper limit. When the cadence is zero, i.e., the user is not pedaling, the (average) torque may either be zero or, in an alternative embodiment, may have a finite value $T_{hold}$, which allows the user to start pedaling with a haptic feeling of initial resistance. In either case, as the cadence increases, the torque increases in such a way that starting acceleration of the pedal(s) is limited, and then the torque starts to decrease according to a "stiffness" of the pedaler which is indicated by the declining thin dashed line. This stiffness may be selected according to a user input, or it can be learnt by the controller through observation during vehicle operation. It should be noted that when the user exceeds any torque or speed limit (indicated by the bold dashed lines), the torque may change, i.e., increase or decrease, to a value that feels uncomfortable for the user, so that he is deterred from exceeding the corresponding limit. Within the mentioned limits, in the operating range, the control unit guides the user along (or towards) the reference trajectory and the average cadence of the reference trajectory can be adapted stepwise so that the preferred cadence is always reached within a reasonable time (e.g. within seconds).

Figure 8:
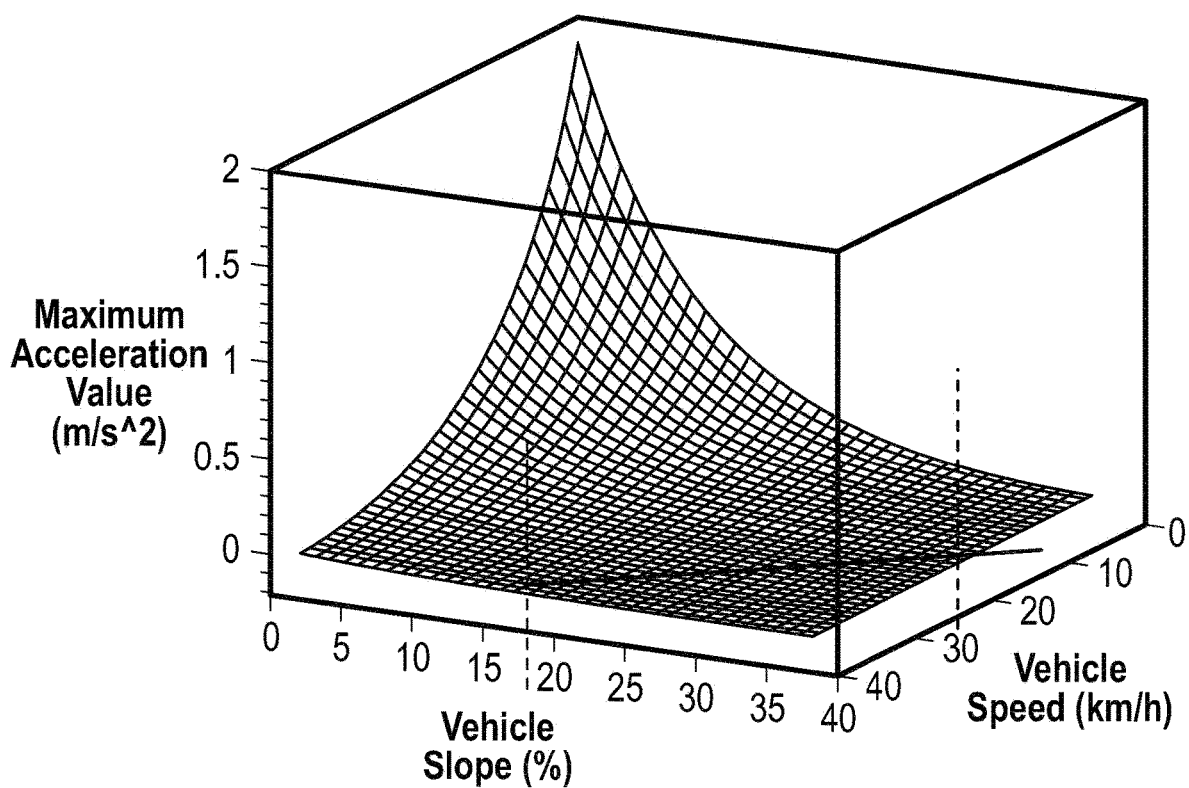
FIG. 8 is a diagram illustrating a reference plane for a maximum acceleration value of an inventive electric drive system.

As mentioned above, the drive controller 33 controls the second power electronics 22, whereby a drive torque and/or an angular velocity of the driven wheel 23 is controlled. In particular, the drive controller 33 can be configured to limit a vehicle acceleration. This limitation is illustrated by FIG. 8, which is a diagram showing a reference plane for a maximum acceleration value. As can be seen, the diagram is a 3D coordinate system, with one axis representing the current vehicle speed, the second axis representing the vehicle track slope, i.e., the slope of a track or driving surface on which the vehicle 100 is running, and the third axis representing the maximum acceleration value. During operation, the current vehicle speed can be easily determined by multiplying the current angular velocity of the driven wheel 23 by its circumference. The vehicle track slope can be determined e.g. by an appropriate inclination sensor of the third sensor unit 42. Thus, using the relation represented by the reference plane in FIG. 8, which may be stored either as a formula or as a look-up table, the drive controller 33 calculates a maximum acceleration value. Further, the drive controller 33 determines a desired vehicle acceleration based on the pedaling performance of the user. For instance, the total power generation by the generator 13 may be monitored and if this power generation is above a certain predefined value, this is interpreted as a desire of the user to accelerate, e.g. at 0.7 m/s$^2$. However, if the determined maximum acceleration value is below the desired vehicle acceleration, the drive controller 33 controls the electric motor 21 so that the maximum acceleration value is not exceeded.

It should be noted that the maximum acceleration value is actually negative for any vehicle speed and vehicle track slope beyond the bold line of FIG. 8. In other words, the bold line also designates a maximum velocity for the respective vehicle track slope in that the user cannot actively accelerate beyond the respective velocity. While the current vehicle speed and the current vehicle track slope are two vehicle state parameters on which the maximum acceleration value depends, it may also depend additionally or alternatively on other vehicle state parameters. For instance, it may depend on the current vehicle position, which can be determined e.g. by a GPS sensor as part of the third sensor unit 42, and a local or national speed limit connected to the vehicle position. I.e., the drive controller 33 can look up the speed limit in a corresponding database and determine the reference plane based on this speed limit. Also, as an alternative to the above-mentioned inclination sensor, the vehicle track slope may be determined by determining the current vehicle position by GPS and by looking up the vehicle track slope in a map or other corresponding database.

Figure 9:
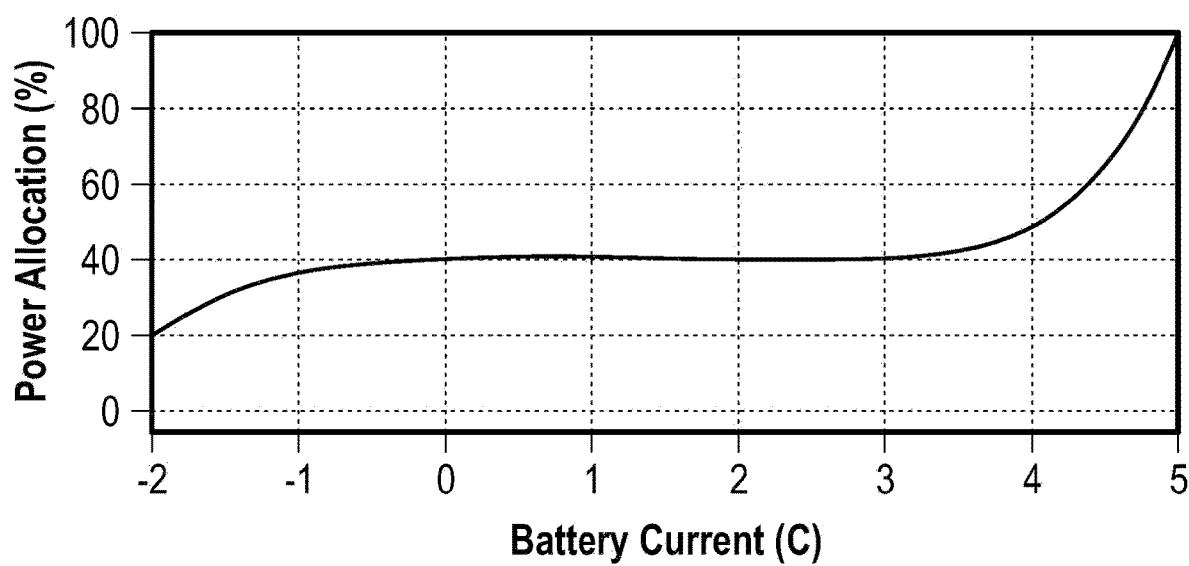
FIG. 9 is a diagram illustrating the power generation allocated to the user of an electric bicycle as a function of the battery current.

As mentioned above, energy for the second power electronics 22 of the electric motor 21 may either be transferred directly from the first power electronics 14 of the generator 13 or from the energy storage device 50. There are many options how power generation can be allocated to the user and the energy storage device 50. FIG. 9 is a diagram illustrating one such option, with the abscissa being the battery current from the energy storage device 50 and the ordinate being the percentage of the power generation allocated to the user, i.e., the generator 13. The percentage changes gradually as a function of the current from the energy storage device 50. Of course, the percentage also changes as a function of the electrical power provided by the energy storage device 50 (which is proportional to the voltage times current). It is almost constant at 40% within a certain range where the battery current is between 0 and 3 times the nominal current. As the battery current increases above 3 times the nominal current, the percentage also increases, e.g. according to a polynomial function, and rises significantly when the current exceeds 4 times the nominal current. At 5 times the nominal current, 100% of the power generation is allocated to the generator 13. However, it should be noted that although the increase in the percentage is considerable, it is still gradual, i.e. there are no "jumps". Therefore, the user may feel and increasing strain, which, however does not increase abruptly but steadily. However, as the battery current becomes negative, i.e. energy is recuperated, the percentage is decreased steadily, e.g.

according to a polynomial function. Such a vehicle behavior protects the battery from being overstrained.

Figure 10:
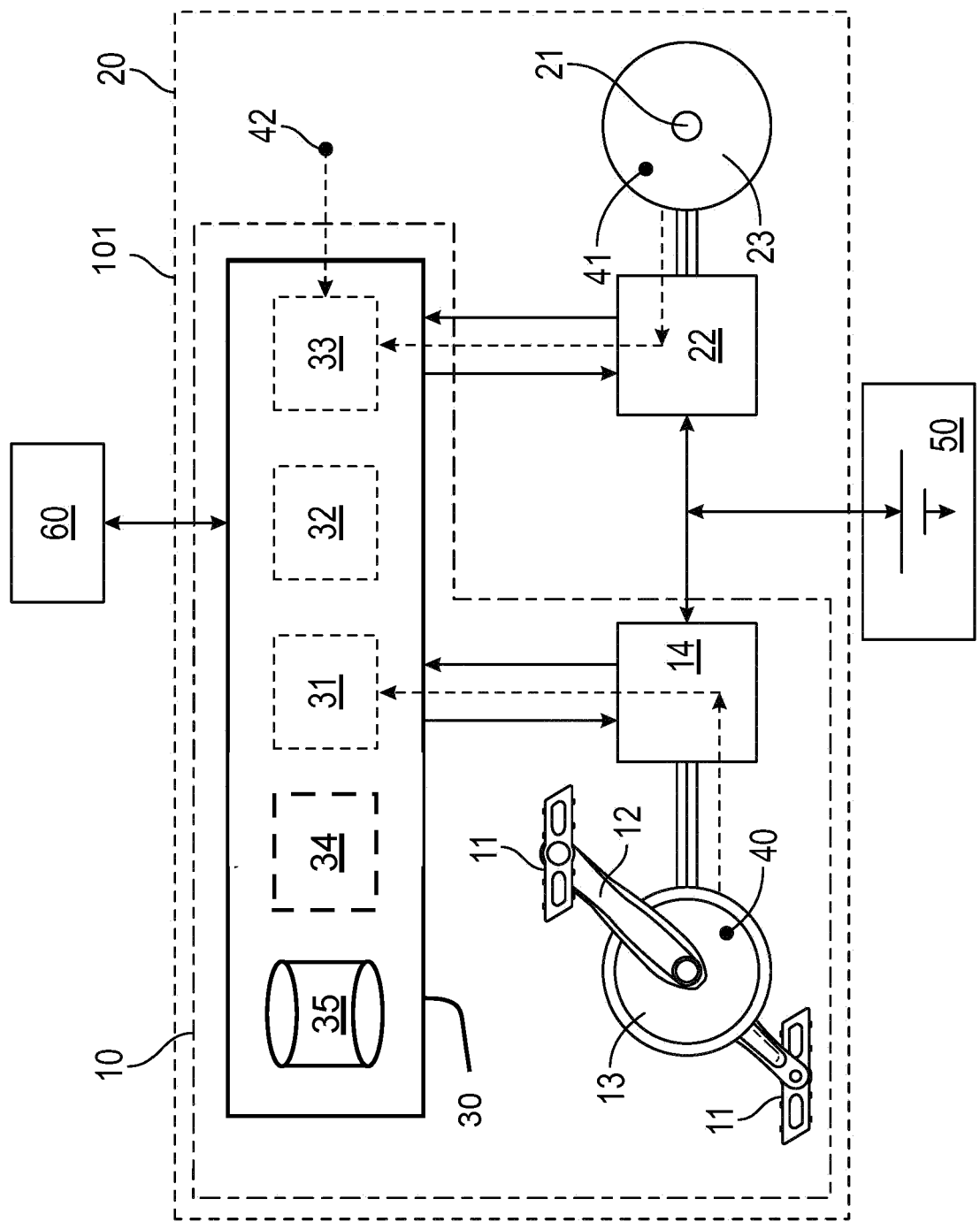
FIG. 10 shows a schematic representation of components of an electric vehicle 101 according to another embodiment.

FIG. 10 shows a schematic representation of components of an electric vehicle 101 according to another embodiment. The electric vehicle 101 according to the present embodiment corresponds to the electric vehicle 100, discussed in the preceding with reference to FIG. 1, with the exception that the control unit 30 further comprises a user trajectory modeler 34 and a trajectory library 35. The trajectory library 35 comprises a plurality of reference trajectories, including user-defined reference trajectories that are generated by the user trajectory modeler 34.

The user trajectory modeler 34 is configured to store a user-defined reference trajectory into trajectory library 35 using machine learning, such as deep learning. In the present embodiment, while a defined user is riding the vehicle 101, the user trajectory modeler 34 analyzes the pedaling-torque-time-history of this specific user in order to derive at least a reference trajectory that is user-specific. The user-defined reference trajectory is then stored in trajectory library 35 and can be retrieved from the trajectory library 35 during the next ride.

For example, the user trajectory modeler 34 may analyze the waveform by determining average value, amplitude in relation to the average, Fourier coefficients, without limitation. Based on the waveform analysis, it is determined if the waveform is sinusoidal, more triangular, or comprises any asymmetry, to derive the user-defined reference trajectory. In some embodiments, the time sequence of the pedaling movements is analyzed to determine repeating patterns or irregularities and differences between left and right leg.

The current embodiment allows to choose a more optimal reference trajectory upon start of pedaling, and during some consecutive pedal revolutions, until the control unit 30 had time to analyze the torque-time history of the current operation in detail and to then adapt the reference trajectory, as discussed in the preceding with reference to FIG. 3.

Figure 11:
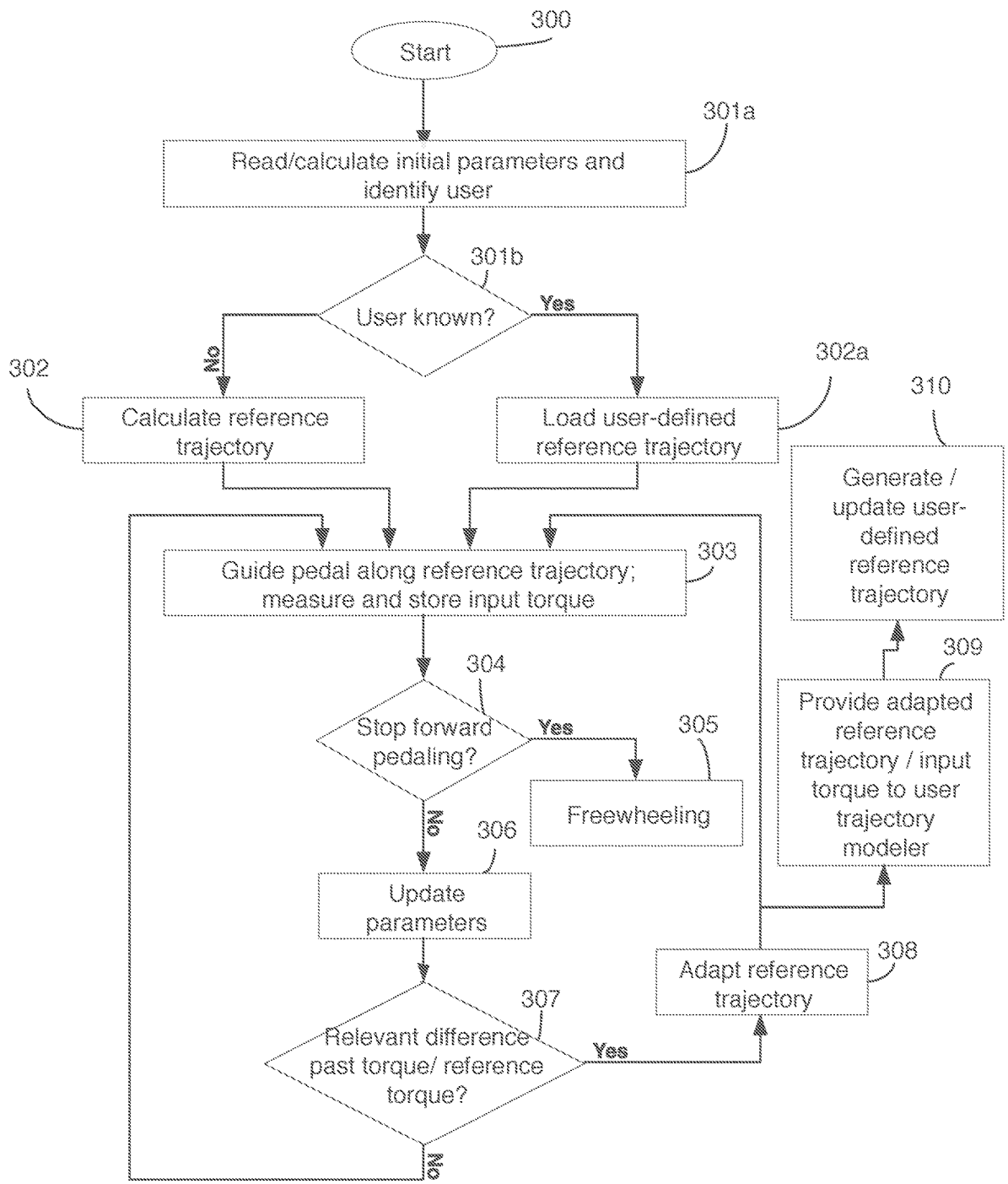
FIG. 11 is a flow diagram of the operation of control unit 30 of FIG. 10.

The operation of control unit 30 of FIG. 10 is shown in the flow diagram of FIG. 11. The operation corresponds to the operation, discussed in the preceding with reference to FIG. 3 with the following exceptions.

In step 301a, the initial parameters comprise an identification of the user, e.g., using a smartphone-vehicle or RFID-card-vehicle communication, entry of a user ID or PIN, or any other suitable method of identification.

On the basis of the user identification, a user-defined reference trajectory of the user is retrieved from the trajectory database 35 in step 302a. The operation then continues with step 303, as discussed in the preceding. Thus, the user-defined reference trajectory serves in particular as "startup guidance".

In case the current user is new to vehicle 101, i.e., no user-defined reference trajectory is present for this user in trajectory library 35, the operation proceeds from step 301b to step 302 as discussed with reference to FIG. 3. Accordingly, a standardized reference trajectory is then used. Steps 303-308 correspond to the operation, discussed with reference to FIG. 3.

In step 308 and as discussed in the preceding with reference to FIG. 3, the reference trajectory is adapted. As discussed with reference to FIG. 3, the adapted reference trajectory is used in following step 303 to guide the pedal along the new reference trajectory.

As follows from FIG. 11, in step 309, the adapted reference trajectory and/or the measured input torque in parallel is provided to the user trajectory modeler 34.

Based on the received data in step 309, the user trajectory modeler 34 in step 310 generates (i.e., if there is no previously stored user-defined reference trajectory for this user) or updates (i.e., if there is a previously stored user-defined reference trajectory for this user) a user-defined reference trajectory, stored in library 35. As will be apparent, the user-defined reference trajectory is improved with every iteration of the loop of steps 303-309 and will match the current user more closely.

The user trajectory modeler 34 may for example use a "Waveform Transfer" to update the user-defined reference trajectory, using a method from the field of human-machine-interaction, such as imitation and blending, without limitation.

Waveform transfer can be conducted by separating the smoothed periodical content of the current user's reference trajectory from the time average of the torque and superposing, eventually after scaling of that periodical content onto the time average of a previous user-defined reference trajectory or, in case no such previous user-defined reference trajectory exists, onto a standardized reference trajectory.

Alternatively, Fast Fourier Transform and digital filtering may be used to extract the main elements of the waveform, which are then applied to a reference trajectory (user-defined or standardized), or stored in the library 35 correspondingly.

In some embodiments, a plurality of user-defined reference trajectories for each user are stored in library 35. The plurality of these user-defined trajectories are stored as "context-depending" trajectories, i.e., each trajectory comprises trip-metadata, for example regarding slope, headwind or weight of the vehicle 101, including the weight of any towed trailer. Accordingly, in step 302a, an associated or "closest match" user-defined reference trajectory is loaded from the plurality user-defined reference trajectories for the current user, depending on the current trip-metadata. For example, in case it is desired to use the vehicle 101 on a mountainous course (as provided to the vehicle 101 by the user in step 301a), a corresponding mountainous user-defined reference trajectory is selected, i.e., a reference trajectory, stored during the user's last ride in mountainous terrain.

Machine learning may not only be applied to the torque-time-histories and corresponding reference trajectories of one single person or user, but to a group of riders. This way, the reference trajectory library 35 "learns" and thus contains statistical information about groups of cyclists.

The correspondingly determined user-defined reference trajectory may not only be used by the haptic renderer 31, but also by drive controller 33. In particular, knowledge about the cycling behavior of the user may be used to recognize pedaling torque peaks more specifically and precisely.

Pedaling torque peak recognition allows for a more efficient control of the electric motor 21. No periodical content in the motor drive torque improves traction on slippery ground. This also leads to a more efficient use of the energy used to drive the vehicle, to decrease battery discharge, while a spontaneous pedal peak impulse by the user may lead to a drive torque peak by the electric motor 21. That means that spontaneous and intuitive actions by a user are reflected in how the vehicle moves, leading to ergonomic compatibility.

In some embodiments, the drive controller 33 comprises a digital filter (not shown), which is configured to distinguish between the periodic and the stochastic components in the input torque, applied by the user to the pedals 11 during operation, and to filter out the periodical components.

Stochastic signal components, i.e., pedal torque impulses or peaks in the torque applied to the pedals 11 can be distinguished from regular, statistically common pedal torque input thanks to the fact that learnt patterns of applying torque to the pedals and the statistics of such patterns are known based on learning. Real time signal analysis methods from the field of digital signal processing for online analysis of time series are applied.

Once peaks in the input torque course are recognized, these peaks and the periodic pedaling are mathematically separated.

From the training data, received by the user trajectory modeler 34, about pedal torque and pedal torque in dependence of pedal position, it is known which torque levels at a certain pedal position are typical for regular pedaling, and which levels are typical for pedal torque impulses. This knowledge is used for separating periodical signal content from pedal torque impulses. The present embodiment allows to drive the electric motor 21 with a drive signal that does not comprise significant periodic signal content stemming from bipedal pedaling.

However, the motor 21 may transmit the full or attenuated peaks in the torque course measured at the pedals 11 also to the wheels, leading to an instantaneous acceleration of the vehicle during the duration of such a pedal torque impulse. This assures that pedaling with high intensity leads to a response by the vehicle 101 that corresponds to the expectations of the user, and thus, ergonomic compatibility is assured.

In one embodiment, e.g., for the real time analysis of the pedal torque course to determine pedaling patterns, it is possible to rely on training data of, e.g., the last three seconds. Additionally or alternatively, information about pedaling torque patterns learnt during previous rides, e.g., hours or even days ago, is analyzed to more reliably recognize pedal torque impulses.

In some embodiments, the digital filter can be parameterized to not attenuate peaks or to attenuate only to a certain degree, and to less or more attenuate or even totally block periodical pedaling (apart from the mean torque) differently from patterns recognized as peaks. Since the transmission of torque and hence pedal and vehicle speed happens more or less attenuated from pedals 11 to the driven wheel 23, the parameterization allows to customize vehicle behavior.

While the invention has been illustrated and described in detail in the drawings and foregoing description, such illustration and description are to be considered illustrative or exemplary and not restrictive; the invention is not limited to the disclosed embodiments. Combinations of multiple embodiments are certainly possible and within the scope of the present invention.

Other variations to the disclosed embodiments can be understood and effected by those skilled in the art in practicing the claimed invention, from a study of the drawings, the disclosure, and the appended claims. For example, it is possible to operate the invention in an embodiment in which:

rather than using the dynamical equation (Eq. 1), the inertia modeler 31 uses a power balances model to derive reference trajectories from the torque-time-history of the user, namely by determining work increments by pedaling (work increment=momentaneous torque*pedal position angle increment). Work increments add to the kinetic energy of the vehicle. During the time needed for the pedals 11 to travel through the pedal position angle increment, however, drag consumes some kinetic energy—drag slows down the vehicle, consumes kinetic energy, unless drag is compensated by enough work. On slopes, kinetic energy is also transformed into potential energy (or vice versa on downslopes). The vehicle speed is then easily derived from kinetic energy, and by dividing through the virtual gear ratio, pedal speed may be calculated. Consecutive values for pedal speed allow to mathematically construct the reference trajectory on behalf of the haptic renderer;

rather than using the dynamical equation (Eq. 1), the inertia modeler 31 uses (ultra)fast convolution hardware. In this embodiment, an impulse response function (IRF) is convolved using the torque-time-history of the user. The impulse response function IRF of a cycle resp. of a pedal of a cycle describes, how the cycle resp. the pedal reacts to one single push onto the pedal. Convolution repeated at high frequency of such an impulse response function with the torque-time-history yields an adapted reference trajectory; and/or in particular for vehicles used in logistics or in sharing schemes, remote diagnosis of the electrical system including but not limited to the control unit 30, components like generator-motor controllers, motor-generator controllers, windings of electrical machines, intermediate circuits (DC intermediate circuit), main switch, and battery, is provided to determine the availability of individual or fleet vehicles anytime in between, before, or during use. In vehicles representing such an embodiment, there is e.g. a serial bus connected to the components mentioned above and to e.g. a mobile phone gateway in order that remote diagnosis is possible. During such a diagnosis the battery may be switched on so that voltage and current for measurements in e.g. the windings of the electrical machines are available.

After the diagnosis, the battery is switched off again or goes into a sleep mode using only very little of the battery's capacity over time.

In the claims, the word "comprising" does not exclude other elements or steps, and the indefinite article "a" or "an" does not exclude a plurality. A single processor, module or other unit may fulfill the functions of several items recited in the claims, or the functions allocated to one element may also be allocated to several distributed elements.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A pedal drive system for generating electrical power from muscle power of a user with at least
  one pedal;
  an electric generator connected mechanically with said at least one pedal; and
  a control unit for controlling a feedback torque applied at said pedal; wherein
    the control unit comprises a trajectory database, comprising at least one user-defined pedal reference trajectory, and a haptic renderer, configured for control of said feedback torque based on the at least one user-defined pedal reference trajectory; wherein the at least one user-defined pedal reference trajectory is based on pedaling behavior of the user during prior use of the pedal drive system.

2. The pedal drive system according to claim 1, further comprising a user trajectory modeler, configured to receive a torque course during use and to generate or update the at least one user-defined pedal reference trajectory based on the torque course.

3. The pedal drive system according to claim 1, wherein the control unit further comprises an inertia modeler, configured to iteratively adapt the at least one user-defined pedal reference trajectory to obtain at least one adapted user-defined pedal reference trajectory, wherein the at least one adapted user-defined pedal reference trajectory is provided to the haptic renderer for control of said feedback torque.

4. The pedal drive system according to claim 3, further comprising a user trajectory modeler, configured to receive the adapted pedal reference trajectory and to generate or update the at least one user-defined pedal reference trajectory based on a received past torque course.

5. The pedal drive system according to claim 1, wherein the at least one user-defined pedal reference trajectory corresponds to a pedal cadence reference trajectory.

6. The pedal drive system according to claim 1, wherein the haptic renderer is configured for impedance control of said feedback torque so that movement of the pedal is adapted to the at least one user-defined pedal reference trajectory.

7. The pedal drive system according to claim 3, wherein the inertia modeler is configured to adapt the at least one user-defined reference trajectory based on at least one trajectory parameter.

8. The pedal drive system according to claim 3, wherein the inertia modeler is configured to:
determine a past torque course for a predefined sampling time,
determine a reference torque course, corresponding to the at least one user-defined reference trajectory, for said predefined sampling time using a vehicle model,
conduct a comparison of the past torque course with the reference torque course, and to
determine at least one adapted user-defined pedal reference trajectory based on said comparison.

9. The pedal drive system according to claim 1, wherein the control unit comprises multiple different pedal reference trajectories.

10. The pedal drive system according to claim 1, wherein said haptic renderer is configured to select one of said multiple reference trajectories automatically based on a trajectory selection signal.

11. The pedal drive system according to claim 3, wherein said inertia modeler is configured to iteratively adapt the at least one user-defined pedal reference trajectory at predetermined intervals which correspond to less than one revolution of said pedal, in particular at most 10 degrees, at most 5 degrees or at most 3 degrees of rotation angle of said pedal.

12. An electric vehicle with a pedal drive system according claim 1, comprising an electronic transmission connecting said generator to an electric load, and/or an electric drive motor.

13. A training apparatus with a pedal drive system for generating electrical power from muscle power of a user with at least
one pedal;
an electric generator; connected mechanically with said at least one pedal; and
a control unit for controlling a feedback torque; applied at said pedal; wherein
the control unit comprises a trajectory database, comprising at least one user-defined pedal reference trajectory, and a haptic renderer, configured for control of said feedback torque based on the at least one user-defined pedal reference trajectory.

14. A method of operating a pedal drive system for generating electrical power from muscle power of a user with at least one pedal and an electric generator, connected mechanically with said at least one pedal, comprising:
controlling a feedback torque, applied at said pedal, based on at least one user-defined pedal reference trajectory; wherein the at least one user-defined pedal reference trajectory is based on pedaling behavior of the user during prior use of the pedal drive system.

15. A pedal drive system for generating electrical power from muscle power of a user with at least
one pedal;
an electric generator connected mechanically with said at least one pedal; and
a control unit for controlling a feedback torque applied at said pedal; wherein
the control unit comprises a trajectory database, comprising at least one user-defined pedal reference trajectory, and a haptic renderer, configured for control of said feedback torque based on the at least one user-defined pedal reference trajectory; wherein
the control unit further comprises an inertia modeler, configured to iteratively adapt the at least one user-defined pedal reference trajectory to obtain at least one adapted user-defined pedal reference trajectory, wherein the at least one adapted user-defined pedal reference trajectory is provided to the haptic renderer for control of said feedback torque.

16. The pedal drive system according to claim 15, further comprising a user trajectory modeler, configured to receive the adapted pedal reference trajectory and to generate or update the at least one user-defined pedal reference trajectory based on a received past torque course.

17. The pedal drive system according to claim 15, wherein the inertia modeler is configured to adapt the at least one user-defined reference trajectory based on at least one trajectory parameter.

18. The pedal drive system according to claim 15, wherein the inertia modeler is configured to:
determine a past torque course for a predefined sampling time,
determine a reference torque course, corresponding to the at least one user-defined reference trajectory, for said predefined sampling time using a vehicle model,
conduct a comparison of the past torque course with the reference torque course, and to
determine at least one adapted user-defined pedal reference trajectory based on said comparison.

19. The pedal drive system according to claim 15, wherein said inertia modeler is configured to iteratively adapt the at least one user-defined pedal reference trajectory at predetermined intervals which correspond to less than one revolution of said pedal, in particular at most 10 degrees, at most 5 degrees or at most 3 degrees of rotation angle of said pedal.

20. An electric vehicle with a pedal drive system according claim 15, comprising an electronic transmission connecting said generator to an electric load, and/or an electric drive motor.

21. A method of operating a pedal drive system for generating electrical power from muscle power of a user with at least one pedal and an electric generator, connected mechanically with said at least one pedal, comprising:
  controlling a feedback torque, applied at said pedal, based on at least one user-defined pedal reference trajectory; and
  iteratively adapting the at least one user-defined pedal reference trajectory to obtain at least one adapted user-defined pedal reference trajectory.

* * * * *